(12) United States Patent
Kuge

(10) Patent No.: US 7,715,972 B2
(45) Date of Patent: May 11, 2010

(54) DRIVING ASSISTING SYSTEM FOR A VEHICLE AND A VEHICLE INSTALLED WITH THE SYSTEM

(75) Inventor: Nobuyuki Kuge, Zushi (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 1217 days.

(21) Appl. No.: 11/270,610

(22) Filed: Nov. 10, 2005

(65) Prior Publication Data

US 2006/0106505 A1 May 18, 2006

(30) Foreign Application Priority Data

Nov. 12, 2004 (JP) .............................. 2004-328820

(51) Int. Cl.
*G05D 1/00* (2006.01)
*G06F 7/00* (2006.01)

(52) U.S. Cl. .............................. 701/96; 701/93; 701/36; 701/70; 701/300; 701/301; 342/455; 340/435; 340/903; 340/436; 180/167; 180/169; 180/170

(58) Field of Classification Search ................... 701/36, 701/70, 93, 96, 300, 301; 340/435, 436, 340/903; 180/167, 169, 170
See application file for complete search history.

(56) References Cited

U.S. PATENT DOCUMENTS

| | | | | |
|---|---|---|---|---|
| 4,491,840 A | * | 1/1985 | Nishikawa et al. | 340/903 |
| 5,485,892 A | * | 1/1996 | Fujita | 180/167 |
| 5,629,669 A | * | 5/1997 | Asano et al. | 340/436 |
| 6,014,601 A | * | 1/2000 | Gustafson | 701/45 |
| 6,420,996 B1 | * | 7/2002 | Stopczynski et al. | 342/70 |
| 6,832,157 B2 | * | 12/2004 | Egami | 701/301 |
| 6,882,915 B2 | * | 4/2005 | Yamamura et al. | 701/45 |
| 6,982,647 B2 | * | 1/2006 | Kuge et al. | 340/576 |
| 7,006,917 B2 | * | 2/2006 | Hijikata | 701/301 |
| 7,136,755 B2 | * | 11/2006 | Yamamura | 701/301 |
| 7,155,342 B2 | * | 12/2006 | Kobayashi et al. | 701/301 |
| 7,167,798 B2 | * | 1/2007 | Kondoh et al. | 701/301 |
| 7,200,481 B2 | * | 4/2007 | Yamamura et al. | 701/96 |
| 7,222,009 B2 | * | 5/2007 | Hijikata et al. | 701/41 |
| 7,349,767 B2 | * | 3/2008 | Kuge et al. | 701/1 |
| 7,386,371 B2 | * | 6/2008 | Kuge et al. | 701/1 |
| 7,391,305 B2 | * | 6/2008 | Knoll et al. | 340/438 |
| 7,440,823 B2 | * | 10/2008 | Yamamura et al. | 701/1 |

(Continued)

FOREIGN PATENT DOCUMENTS

EP 1 375 280 A2 1/2004

(Continued)

OTHER PUBLICATIONS

Japanese Office Action, with English translation, issued in Japanese Patent Application No. 2004-328820, mailed Mar. 31, 2009.

*Primary Examiner*—Thomas G Black
*Assistant Examiner*—Wae Louie
(74) *Attorney, Agent, or Firm*—McDermott Will & Emery LLP

(57) ABSTRACT

Driving assisting systems and methods that regulate a reaction force applied to an accelerator pedal based on risk potential, estimated driver's intention and necessity for acceleration, in response to an estimated driver's intention being a predetermined type of intention.

23 Claims, 16 Drawing Sheets

U.S. PATENT DOCUMENTS

| | | | |
|---|---|---|---|
| 2002/0152015 A1* | 10/2002 | Seto | 701/96 |
| 2003/0135317 A1* | 7/2003 | Hijikata et al. | 701/70 |
| 2003/0236602 A1* | 12/2003 | Kuge et al. | 701/36 |
| 2004/0172185 A1* | 9/2004 | Yamamura et al. | 701/96 |
| 2004/0249549 A1* | 12/2004 | Kondoh et al. | 701/96 |
| 2005/0033517 A1* | 2/2005 | Kondoh et al. | 701/301 |
| 2005/0090984 A1* | 4/2005 | Kobayashi et al. | 701/301 |
| 2005/0131589 A1* | 6/2005 | Yamamura et al. | 701/1 |
| 2005/0131590 A1* | 6/2005 | Kuge et al. | 701/1 |
| 2005/0273215 A1* | 12/2005 | Kuge | 701/1 |
| 2005/0288844 A1* | 12/2005 | Kimura et al. | 701/100 |
| 2006/0106505 A1* | 5/2006 | Kuge | 701/1 |
| 2006/0178789 A1* | 8/2006 | Kuge | 701/1 |
| 2007/0050110 A1* | 3/2007 | Kondoh et al. | 701/36 |
| 2007/0078602 A1* | 4/2007 | Yamamura et al. | 701/301 |
| 2007/0276577 A1* | 11/2007 | Kuge et al. | 701/96 |
| 2008/0004806 A1* | 1/2008 | Kimura et al. | 701/301 |
| 2008/0004807 A1* | 1/2008 | Kimura et al. | 701/301 |

FOREIGN PATENT DOCUMENTS

| | | |
|---|---|---|
| EP | 1 426 230 A2 | 6/2004 |
| JP | 10-166889 A | 6/1998 |
| JP | 2004-017930 A | 1/2004 |

* cited by examiner

DRIVING ASSISTING SYSTEM FOR A VEHICLE AND A VEHICLE INSTALLED WITH THE SYSTEM

RELATED APPLICATION

This application claims the benefit of priority from Japanese Patent Application No. 2004-328820, filed on Nov. 12, 2004, the disclosure of which is incorporated herein by reference in its entirety.

FIELD OF THE DISCLOSURE

The present disclosure relates to a driving assisting system for a vehicle, and more specifically, to a driving assisting system that adjusts a reaction force applied to an accelerator pedal of the vehicle based on risk potential, estimated driver's intention and necessity for acceleration, in response to an estimated driver's intention being a predetermined type of intention.

BACKGROUND OF THE DISCLOSURE

Some driving assisting systems regulate an accelerator pedal reaction force based on running conditions around the own vehicle. Based on driver's behavior intention detected, the systems adjust or modify the regulated accelerator pedal reaction force. In particular, this type of driving assisting systems reduces the regulated accelerator pedal reaction force upon detecting a driver's intention to change to a new lane.

Such type of driving assisting systems is satisfactory in that a reduction in the regulated accelerator pedal reaction force allows a driver to accelerate a vehicle smoothly to pass or overtake the preceding vehicle ahead. However, this type of systems does not consider that a driver may have the same intention under various running conditions in which a vehicle is traveling. Accordingly, a need remains for varying adjustment of the accelerator pedal reaction force with different running conditions upon detecting the same driver's intention.

SUMMARY OF THE DISCLOSURE

The disclosure describes driving assisting systems and methods that regulate a reaction force applied to an accelerator pedal based on risk potential, estimated driver's intention and necessity for acceleration, in response to an estimated driver's intention being a predetermined type of intention.

An exemplary driving assisting system for an own vehicle comprises a detector configured to detect at least one of an operation status of the own vehicle and a running environment around the own vehicle, and a risk potential calculating device configured to calculate risk potential associated with the own vehicle based on a detection result of the detector. A driver's intention detecting device is provided to estimate a driver's intention, and an acceleration necessity judging device is used to judge necessity for acceleration. In response to the estimated driver's intention being a predetermined type of intention, a data processor determines a reaction force to be transmitted to a driver from an accelerator pedal based on the calculated risk potential, the estimated driver's intention and a judgment result of the acceleration necessity judging device.

An exemplary driving assisting method according to this disclosure detects at least one of an operation status of an own vehicle and a running environment around the own vehicle. Risk potential associated with the own vehicle is calculated based on a detection result of the detector. A driver's intention is estimated and necessity for acceleration is determined. Responsive to the estimated driver's intention being a predetermined type of intention, a reaction force to be transmitted to a driver from an accelerator pedal is determined based on the calculated risk potential, the estimated driver's intention and the necessity for acceleration.

An exemplary vehicle with a driving assisting system includes a detector configured to detect at least one of an operation status of the own vehicle and a running environment around the vehicle, a risk potential calculating device configured to calculate risk potential associated with the vehicle based on a detection result of the detector, a driver's intention detecting device configured to estimate a driver's intention, and an acceleration necessity judging device configured to judge necessity for acceleration. A data processor is provided to determine a reaction force to be transmitted to a driver from an accelerator pedal based on the calculated risk potential, the estimated driver's intention and the necessity for acceleration, in response to the estimated driver's intention being a predetermined type of intention.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

DETAILED DESCRIPTION OF ILLUSTRATIVE EMBODIMENTS

The accompanying drawings and descriptions illustrate various exemplary embodiments of a driving assisting system according to the present disclosure.

First Exemplary Embodiment

Figure 1:
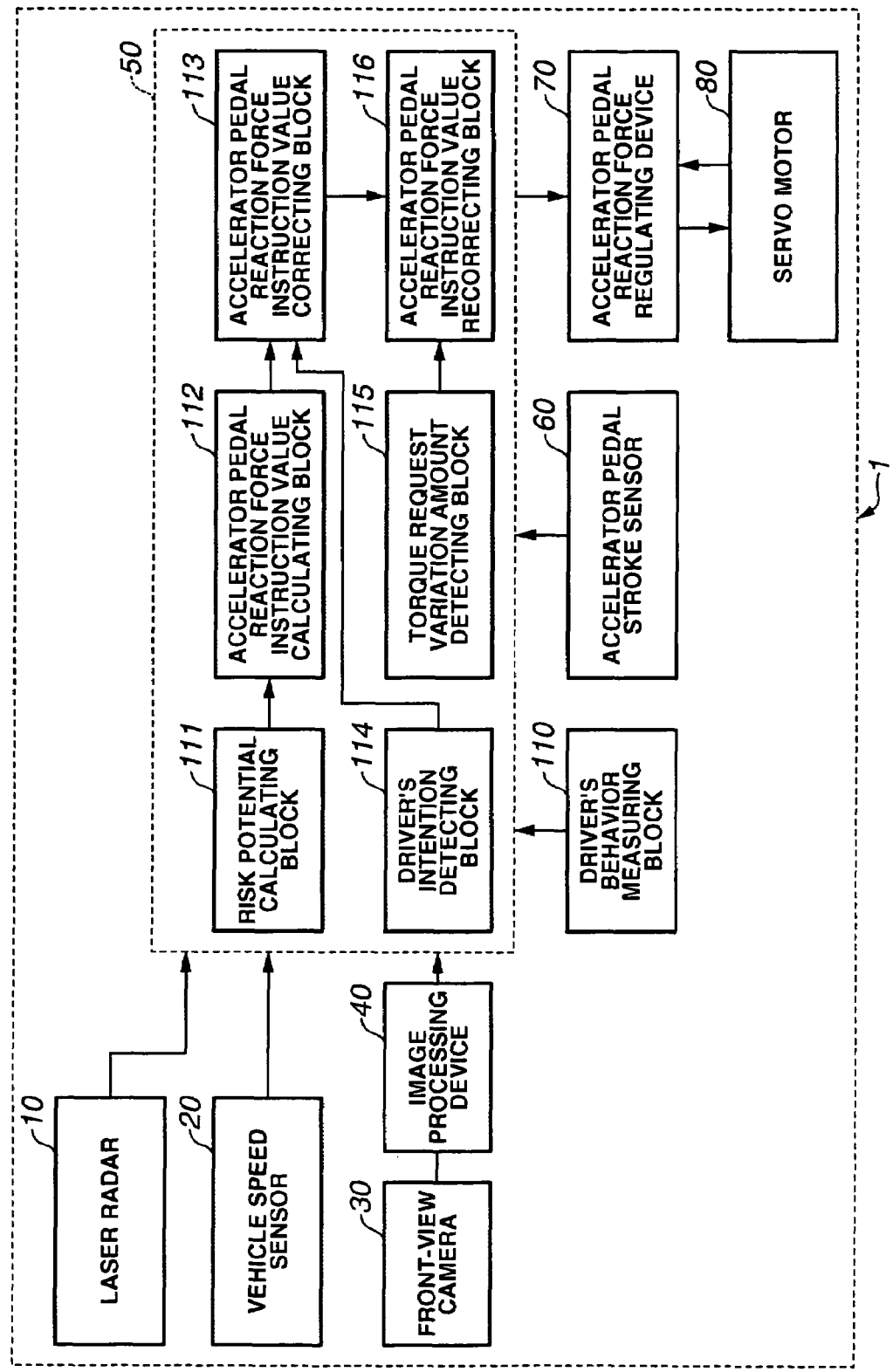
FIG. 1 is a block diagram showing the constituent elements of a first exemplary embodiment of a driving assisting system for a vehicle according to the present disclosure.
Figure 2:
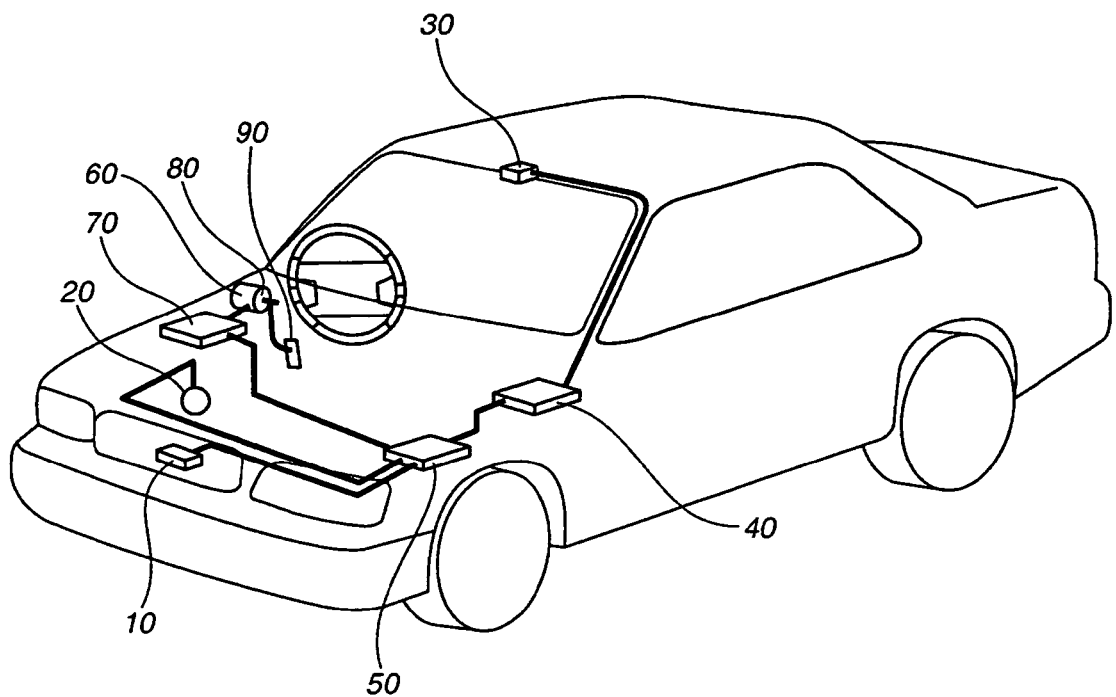
FIG. 2 is a perspective view of a vehicle installed with the driving assisting system shown in FIG. 1.

With reference to FIGS. 1 and 2, the first exemplary embodiment according to the present disclosure is described. FIG. 1 is a block diagram showing the constituent elements of the first exemplary embodiment of a driving assisting system 1 for a vehicle according to the present disclosure. FIG. 2 is a perspective view of a vehicle installed with the driving assisting system 1.

Laser radar 10 is positioned at a center of a front grill or a front bumper of the vehicle for transmitting infrared pulsed beam in one or more selected directions, such as horizontally, to scan a measurement region in front of the vehicle. The laser radar 10 measures reflected waves of the transmitted infrared beam returning from obstacles, such as rear ends of the preceding vehicles, inside the measurement region, and detects an inter-vehicle distance between the vehicle and each of the preceding vehicles and a relative speed between them by analyzing an arrival time of the reflected waves. The laser radar 10 provides the detected inter-vehicle distance and relative speed to a controller 50. In the embodiment, the laser radar 10 can swivel the transmitted infrared pulsed beam horizontally and laterally about 6 degrees to each side of a longitudinal line passing through the center of the vehicle.

A vehicle speed sensor 20 detects a vehicle speed of the own vehicle by measuring a revolution per minute of at least one wheel or a revolution per minute of an output member of a transmission, and provides the detected vehicle speed to the controller 50.

A front-view camera 30, which may be in the form of a small-sized CCD camera or a CMOS camera positioned at an upper portion of a front windshield, to detect an image covering a road scene in front of the own vehicle. The front-view camera 30 provides image signals to an image processing device 40. The image processing device 40 processes the image signals from the front-view camera 30 and provides the processed result to the controller 50. The front-view camera 30 covers a region that extends horizontally and laterally about 6 degrees to each side of a longitudinal line passing through the center of the vehicle and captures image of road scenes within this region.

A driver's behavior measuring device 110 detects, for example, a state of turn signal indicators, to detect a driver's intention, such as, a driver's intention to change to the adjacent lane or to pass or overtake the preceding vehicle. The driver's behavior measuring device 110 provides the detected result to the controller 50.

Figure 3:
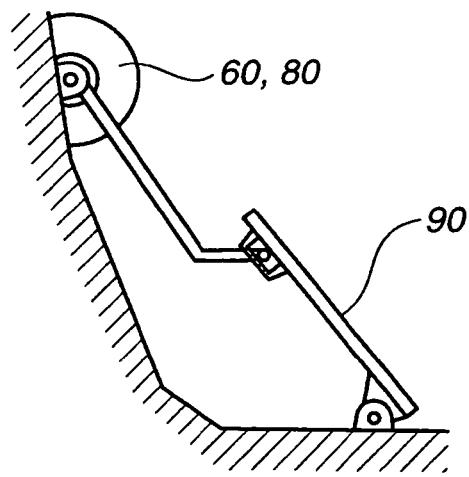
FIG. 3 is a view of an accelerator pedal and its peripheral constituent elements.

As shown in FIG. 3, a servo motor 80 and an accelerator pedal stroke sensor 60 are connected, via a linkage mechanism, to an accelerator pedal 90. Because the servo motor 80 rotates as the accelerator pedal 90 strokes in response to an operation by the driver, the accelerator pedal stroke sensor 60 detects a stroke amount S (operation amount S) of the accelerator pedal 90 by measuring rotary angles through which the servo motor 80 has rotated.

The controller 50 is composed of a central processor unit (CPU) and CPU peripheral items including a read only memory (ROM) and a random access memory (ROM). The controller 50 provides, hardware or software-implemented or a combination of both, a risk potential calculating device 111, an accelerator pedal reaction force instruction value calculating device 112, an accelerator pedal reaction force instruction value correcting device 113, a driver's intention detecting device 114, a torque request variation amount detecting device 115, and an accelerator pedal reaction force instruction value recorrecting device 116.

The risk potential calculating device 111 calculates risk potential RP with regard to each of obstacles around the own vehicle. Calculation of the risk potential RP is carried out based on a vehicle speed of the own vehicle, an inter-vehicle distance between the own vehicle and each of the obstacles, a relative speed between the own vehicle and each of the obstacles, such as, the preceding vehicle in front of the own vehicle, which are given by processing inputs from the vehicle speed sensor 20 and the laser radar 10, and image information on surroundings of the own vehicle given as an input from the image processing device 40. Based on the calculated risk potentials RP provided by the risk potential calculating device 111, the accelerator pedal reaction force instruction value calculating device 112 calculates an instruction value FA for accelerator pedal reaction force to be generated at the accelerator pedal 90.

The driver's intention detecting device 114 estimates a driver's intention based on an ON/OFF status of turn signal indicators measured at the driving behavior measuring device 110. In one embodiment, it is estimated that a driver intends to change to the adjacent lane or pass the preceding vehicle immediately after the driver has signaled with his turn signal indicators.

The accelerator pedal reaction force instruction value correcting device 113 corrects the calculated accelerator pedal reaction force instruction value FA provided by the accelerator pedal reaction force calculating device 112 in response to the estimated driver's intention provided by the driver's intention estimating device 114. The torque request variation amount detecting device 115 calculates an increase $\Delta Td$ in a driver torque request based on the operation amount S of the accelerator pedal 90 detected by the accelerator pedal stroke sensor 60. The increase $\Delta Td$ in a driver torque request, which is calculated from an increase in depression of the accelerator pedal 90 by the driver, is a value indicative of how quickly the driver wishes to accelerate.

The accelerator pedal reaction force instruction value recorrecting device 116 corrects again the corrected accelerator pedal reaction force instruction value FAc provided by the accelerator pedal reaction force instruction value correcting device 113 based on the increase ΔTd in the driver torque request provided by the torque request variation amount detecting device 115. The accelerator pedal reaction force instruction value recorrecting device provides the twice-corrected accelerator pedal reaction force instruction value FAcc to an accelerator pedal reaction force regulating device 70.

The accelerator pedal reaction force regulating device 70 regulates an accelerator pedal reaction force in response to the twice-corrected accelerator pedal reaction force instruction value FAcc. In response to different instructions provided by the accelerator pedal reaction force regulating device 70, the servo motor 80 can regulate torque and rotary angles thereby to vary an increment, in magnitude, of a reaction force that is transmitted to the driver upon operating the accelerator pedal 90 with the different instructions. When such reaction force control is not carried out, the increment of the reaction force is zero, thus allowing ordinary varying characteristics of the reaction force, that is, the accelerator pedal reaction force is generally proportional to the operation amount S. The ordinary varying characteristics are realized due to a spring force produced by a torsion spring (not shown) provided around an axis of rotation of the accelerator pedal 90.

Next, the following sections provide general descriptions on how the first exemplary embodiment of driving assisting system 1 works.

Based on the running state of and the running environments around the own vehicle detected by the vehicle speed sensor 20, laser radar 10 and front-view camera 30, the controller 50 calculates a value of risk potential RP. Based on the calculated value of risk potential RP, the controller 50 regulates the magnitude of a reaction force that is transmitted to the driver via the accelerator pedal 90 when the driver is operating the accelerator pedal 90. The magnitude of the accelerator pedal reaction force increases as the value of risk potential RP increases, to convey information related to the value of risk potential RP to the driver more effectively.

Upon detecting the driver's intention to change to the adjacent lane, the controller 50 performs a correction to reduce the accelerator pedal reaction force, thus smoothens the driver's operation in accomplishing acceleration. This correction makes it easier for the driver to depress the accelerator pedal 90 for quick acceleration to pass or overtake the preceding vehicle immediately after catching it up.

If the preceding vehicle is slower than the own vehicle traveling at a constant speed, it is not necessary for the own vehicle to accelerate upon passing the preceding vehicle after approaching it. Under this condition, a reduction in accelerator pedal reaction force might disturb the driver in operating the accelerator pedal 90 by unnecessary acceleration as a result of the reduced reaction force.

To solve the above-mentioned problem, the first exemplary embodiment carries out a detection of a driver acceleration request, i.e., an additional driving torque that a driver wishes to apply to its own vehicle, by measuring an increase in depression of the accelerator pedal 90. When the driver requests for acceleration, the correction of accelerator pedal reaction force as described earlier is carried out in response to driver's intention being an intention to change to the adjacent lane, thereby allowing a quick reduction in accelerator pedal reaction force for smooth acceleration. In the description of this exemplary embodiment, the correction that the accelerator pedal reaction force is reduced to the ordinary varying characteristics is called "reaction force release." When the driver does not request for acceleration, the accelerator pedal reaction force is gradually reduced after estimate of driver's intention to change to the adjacent lane, thereby gradually releasing the accelerator pedal reaction force.

Figure 4:
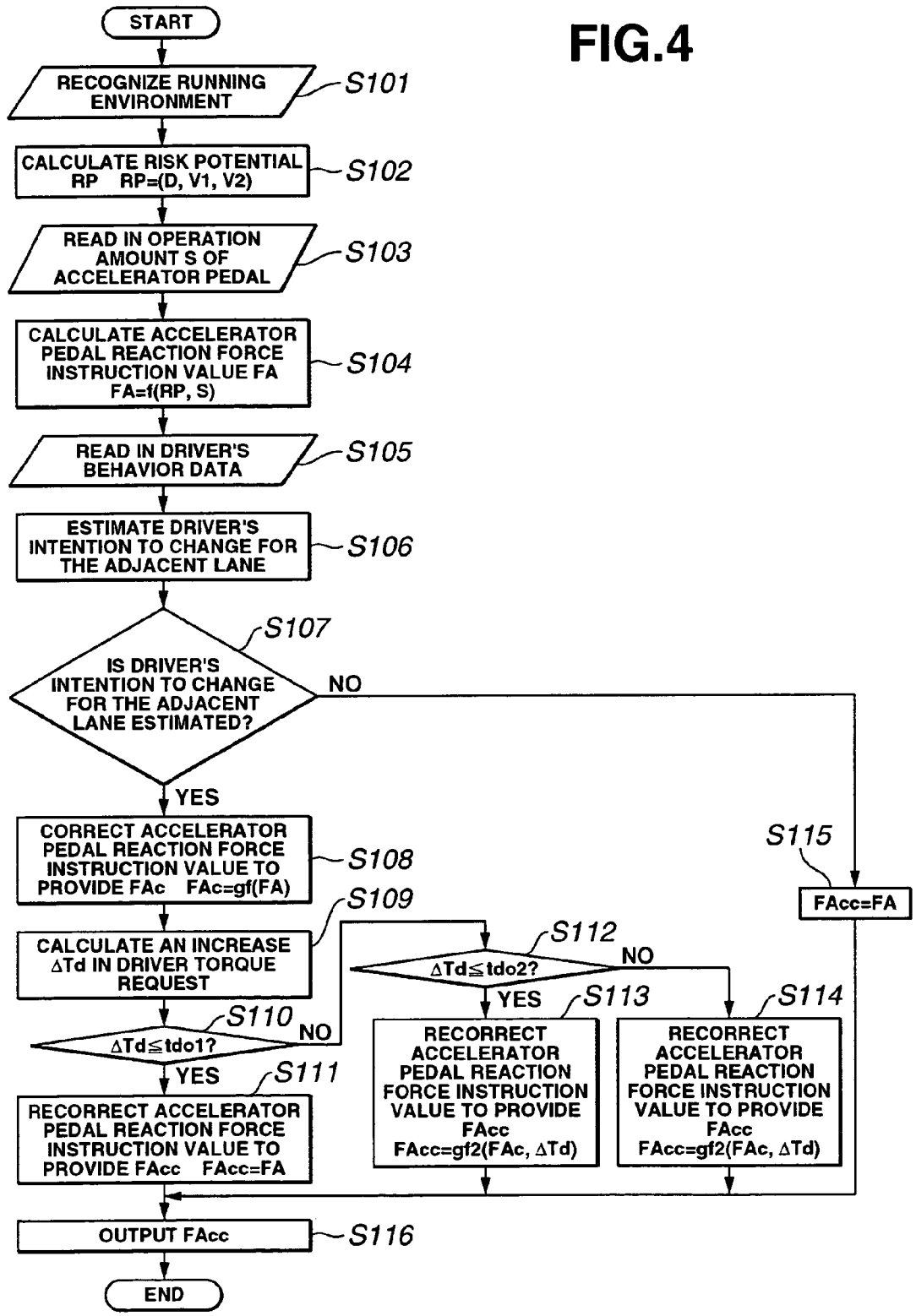
FIG. 4 is a flow chart illustrating a driving assisting control program according to the first exemplary embodiment.

Referring to FIG. 4, the following sections provide detailed descriptions on how the first exemplary embodiment works. FIG. 4 is a flow chart illustrating steps of a driving assisting control program stored and executed by the controller 50. Execution of this control program is repeated at regular intervals of, for example, 50 milliseconds.

Step S101 is provided to recognize running environment around the own vehicle as detected by the laser radar 10, vehicle speed sensor 20 and front-view camera 30. Information related to the running environment includes an inter-vehicle distance D between the own vehicle and the preceding vehicle, a vehicle speed V2 of the preceding vehicle and a vehicle speed V1 of the own vehicle. Step S102 is provided to calculate risk potential RP associated with the own vehicle based on the recognized running environment. First, a time to contact TTC is calculated.

The time to contact TTC is a physical quantity indicative of a degree to which the own vehicle is approaching the preceding vehicle. The time to contact TTC is a measure of time from the current moment to a future moment when the own vehicle will come into contact with the preceding vehicle and the inter-vehicle distance D will become zero if a relative speed Vr (Vr=V1−V2) remains unaltered. The TTC may be expressed as:

$$TTC = D/Vr \qquad (Eq. 1)$$

The shorter the time to contact TTC, the more imminent a collision may occur and the higher the degree to which the own vehicle has approached the preceding vehicle. It is well known that a driver starts decelerating an own vehicle to avoid collision with the preceding vehicle before the time to contact TTC becomes less than 4 seconds when approaching the preceding vehicle.

Second, using the calculated time to contact TTC, risk potential RP with regard to the preceding vehicle is calculated. The risk potential RP with regard to the preceding vehicle may be expressed as:

$$RP = 1/TTC \qquad (Eq. 2)$$

Step 103 obtains an operation amount S of the accelerator pedal 90 detected by the accelerator pedal stroke sensor 60. Step S104 calculates an accelerator pedal reaction force instruction value FA based on the value of risk potential RP calculated at step S102. First, an increase ΔF in the reaction force is calculated based on risk potential RP.

Figure 5:
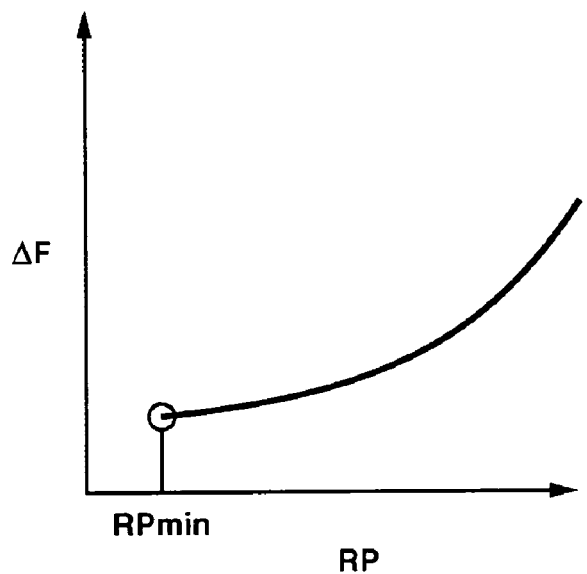
FIG. 5 shows the relationship between a risk potential and an increase in reaction force.

FIG. 5 illustrates the relationship between risk potential RP with regard to the preceding vehicle and an increase ΔF in reaction force. As shown in FIG. 5, an increase ΔF in the reaction force continues to assume a value of 0 (zero) responsive to values of risk potential RP being less than a predetermined minimum value RPmin. This setting has proven to be effective in avoiding annoying the driver due to varying of accelerator pedal reaction force FA over a range of very small values of risk potential RP. A predetermined appropriate value may be set as the minimum value RPmin.

Responsive to values of risk potential RP being no less than the predetermined minimum value RPmin, an increase ΔF in the reaction force increases exponentially with risk potential RP and may be expressed as:

$$\Delta F = \alpha \cdot RP^n \qquad (Eq. 3)$$

where: α and n are constants, which are preset for effective conversion from risk potential RP to an increase ΔF in reaction force based on results of simulations using a driver simulator or results of a field test of a vehicle, and they assume different values depending on types of vehicles.

The increase ΔF in reaction force is added the reaction force having the ordinary varying characteristics, and an operation amount S of the accelerator pedal that generates an accelerator pedal reaction force instruction value FA.

Step S105 reads in driver's behavior data detected by the driver's behavior measuring device 110. For instance, the driver's behavior data is an ON or OFF signal indicative of a state of turn signal indicators. Step S106 estimates the driver's intention. The driver's intention to change to the adjacent lane is estimated upon a change in the state of turn signal indicators from OFF to ON, which indicates that the driver intention to make turns.

Step S107 is provided to judge whether or not the driver's intention to change to the adjacent lane has been estimated. If driver's intention to change to the adjacent lane has been estimated, the logic goes to step S108. Step S108 is provided to correct the accelerator pedal reaction force instruction value FA that has been calculated at step S104. In concrete terms, calculating a first-order delay-filter reduces the accelerator pedal reaction force instruction value FA, which was obtained immediately after or upon estimating driver's intention to change to the adjacent lane, to give the result as an accelerator pedal reaction force corrected instruction value FAc when the driver's intention to change to the adjacent lane has been estimated. Using a time constant Tsf and a coefficient a, the corrected instruction value FAc may be expressed as:

$$FAc = gf(FA) \quad \text{(Eq. 4)}$$
$$= k \times 1/(1 + a \times Tsf) \times FA$$

where: k is a constant gain factor determining the level of pedal force reduction. Tsf is a time constant of first order filter and affect how quickly pedal force would be reduced. For instance, 1.0 sec could be used. Constant a is a delay time associated with Tsf and may have a value 1.0.

The next step S109 is provided to calculate an increase ΔTd in driver torque request, which is indicative of how strongly the driver demands acceleration. In this exemplary embodiment, the increase ΔTd in driver torque request is an increase in an operation amount S of the accelerator pedal 90 over a predetermined period of time immediately after driver's intention to change to the adjacent lane has been estimated. The increase ΔTd in driver torque request is indicative of a need for acceleration immediately after driver's intention to change to the adjacent lane has been estimated.

Step S110 is provided to judge whether or not the increase ΔTd in driver torque request is less than or equal to a predetermined value tdo1. If ΔTd≦tdo1, the logic goes to step S111. Step S111 is provided to release the correction made to the accelerator pedal reaction force instruction value FA (see step S108) by setting the accelerator pedal reaction force instruction value FA already obtained at step S104 upon estimation of driver's intention to change to the adjacent as an accelerator pedal reaction force recorrected instruction value FAcc (FAcc=FA) because there is no need for acceleration accounting for the fact that the increase ΔTd in driver torque request is small. This accelerator pedal reaction force instruction value FA determined upon estimation of driver's intention to change to the adjacent lane is held for use as the recorrected instruction value FAcc until the completion of changing to the adjacent lane.

If the interrogation at step S110 results in negative, the logic goes to step S112 where a judgment is made whether or not the increase ΔTd is less than or equal to another predetermine value tdo2 (>tdo1). If the interrogation at step S112 results in affirmative, that is, tdo1<ΔTd≦tdo2, the logic goes to step S113. Step S113 is provided to recorrect or correct again the accelerator pedal reaction force corrected instruction value FAc obtained at step S108 in response to the increase ΔTd in driver torque request (obtained at step S109). First, a coefficient Kftd that is multiplied with the time constant Tsf is set in response to the increase ΔTd in driver torque request.

Figure 6:
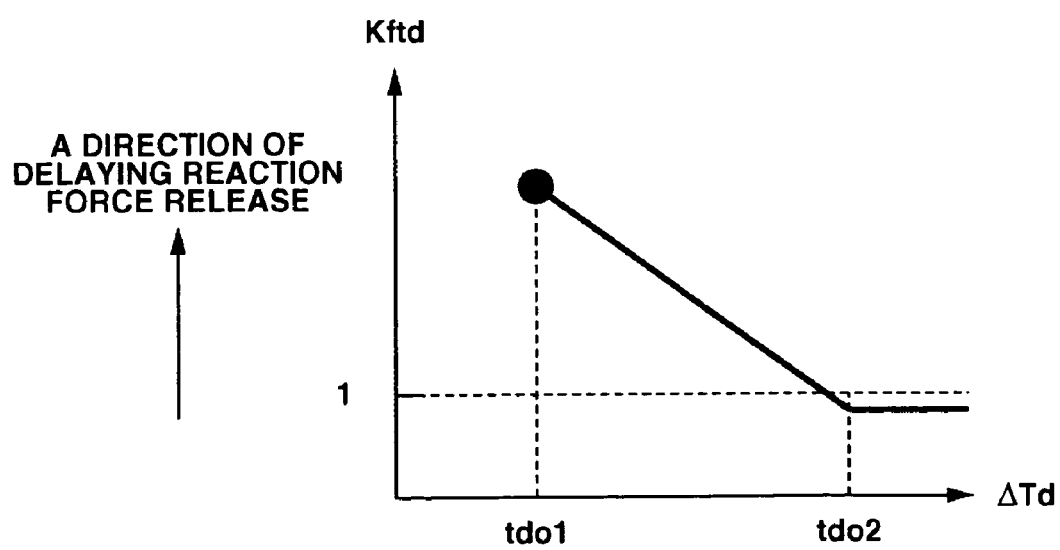
FIG. 6 shows the relationship between an increase in driver torque request and a coefficient for a time constant used to correct accelerator pedal reaction force.

If tdo1<ΔTd≦tdo2, the accelerator pedal reaction force is released gradually based on a determination that the less the increase ΔTd in driver torque request, the less the necessity for accelerating the vehicle is. This gradual release is controlled by increasing a time constant term (Kftd×a×Tsf) for accelerator pedal reaction force correction by increasing the coefficient Kftd as the increase ΔTd in driver torque request becomes less as shown in FIG. 6.

Using the correction coefficient Kftd that varies with the increase ΔTd in driver torque request, the accelerator pedal reaction force corrected instruction value FAc is recorrected (corrected again) to provide an accelerator pedal reaction force recorrected instruction value FAcc. The recorrected instruction value FAcc may be expressed as:

$$FAcc = gf2(FAc) \quad \text{(Eq. 5)}$$
$$= k \times 1/(1 + Kftd \times a \times Tsf) \times FAc$$

wherein k is a constant gain factor determining the level of pedal force reduction. Tsf is a time constant of first order filter and affect how quickly pedal force would be reduced. For instance, 1.0 sec could be used. Constant a is a delay time associated with Tsf and may have a value 1.0. Kftd is related to a delay time associated with Tsr and may have a value 1.0.

If the interrogation at step S112 results in negative, that is, ΔTd>tdo2, the logic goes to step S114. The step S114 is provided to recorrect (correct again) the accelerator pedal reaction force corrected instruction value FAc using the above mentioned equation Eq. 5. Measurement of an increase ΔTd in driver torque request precedes beginning of release of accelerator pedal reaction force, so that a delay for the measurement is inevitable. Accounting for this inevitable delay, the coefficient Kftd is set less than 1 (Kftd<1) against the increase ΔTd, which is greater than tdo2, as shown in FIG. 6, to shorten a elapsed time from estimating driver's intention to change to the adjacent lane to the beginning of release (beginning of reduction) of accelerator pedal reaction force.

If the interrogation at step S107 results in negative, the logic goes to step S115. This is the case when driver's intention to change to the adjacent lane has not been estimated. Step S115 is provided to set the accelerator pedal reaction force instruction value FA obtained at step S104 as the recorrected instruction value FAcc.

Step S116 is provided to output the accelerator pedal reaction force recorrected instruction value FAcc that is obtained at step S111 or step S113 or step S114 or step S115. After step S116, the present execution comes to an end. The controller 50 feeds this accelerator pedal reaction force recorrected instruction value FAcc to the accelerator pedal reaction force regulating device 70. The accelerator pedal reaction force regulating device 70 varies accelerator pedal reaction force with different instruction values FAcc in proportional relationship by controlling the servo motor 80.

Figure 7:
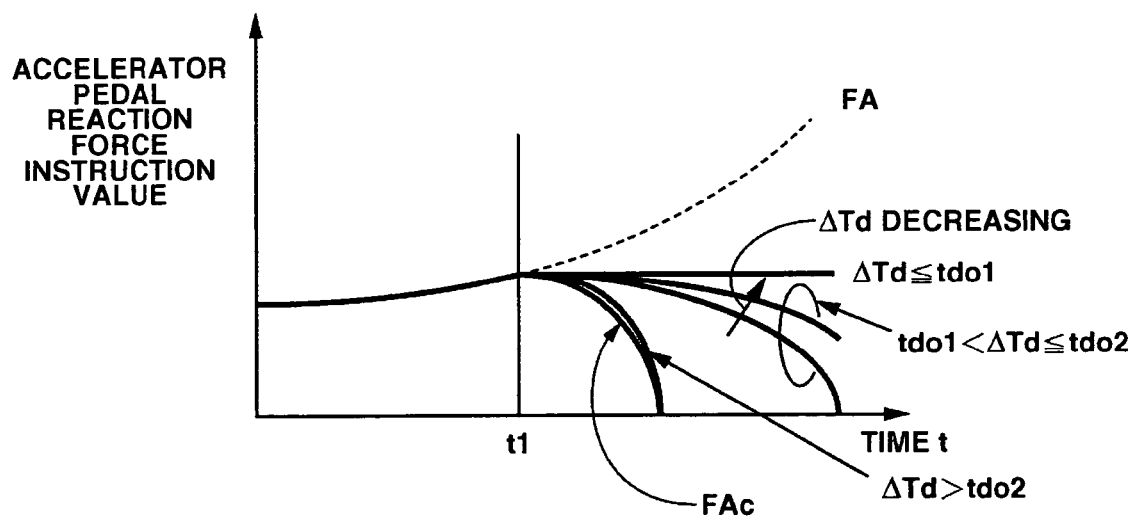
FIG. 7 is illustrates how the first exemplary embodiment works.

Referring to FIG. 7, operation of the first exemplary embodiment is described. FIG. 7 shows varying of accelerator pedal reaction force instruction value with time when the own vehicle passes the preceding vehicle. In FIG. 7, at the moment t1, driver's intention to change to the adjacent lane is estimated. Until the moment t=t1, accelerator pedal reaction force instruction value continuously varies in accordance with running environment.

If driver's intention to change to the adjacent lane is not estimated, the accelerator pedal reaction force instruction value FA increases as risk potential RP grows when the own vehicle is approaching the preceding vehicle. Immediately after or upon estimating driver's intention to change to the adjacent lane at the moment t=t1, the accelerator pedal reaction force instruction value FA is corrected to provide an accelerator pedal reaction force corrected instruction value FAc. The corrected instruction value FAc reduces with the first-order delay-filter.

The accelerator pedal reaction force corrected instruction value FAc is recorrected in various manners depending on different degrees of strength the driver has upon accelerating the own vehicle. If an increase $\Delta Td$ in driver torque request obtained immediately after or upon estimating driver's intention to change to the adjacent lane is less than or equal to the predetermined value tdo1, the accelerator pedal reaction force instruction value FA obtained at the moment (t=t1) upon estimating the driver's intention to change to the adjacent lane is held. This logic works in a traffic scene when the own vehicle is approaching the preceding vehicle at the same vehicle speed and then passing it without any necessity to accelerate the own vehicle. In this traffic scene, canceling the release of accelerator pedal reaction force maintains equilibrium state between a force with which the driver depresses the accelerator pedal 90 and a reaction force transmitted to the driver via the accelerator pedal 90.

If tdo1<$\Delta Td$≦tdo2, the less the increase $\Delta Td$ in driver torque request, the more the release of accelerator pedal reaction force is carried out gradually because a need to accelerate the own vehicle remains small. This logic works to prevent a rapid reduction in the accelerator pedal reaction immediately after or upon estimation of driver's intention to change to the adjacent lane, thereby allowing the driver to carry out appropriate control to realize his intention by restraining the driver from depressing deeply unintentionally. If $\Delta Td$>tdo2, there is a strong need to accelerate the own vehicle and the accelerator pedal reaction force is quickly released to allow the driver to carry out a smooth driving operation in accordance with his/her intention to accelerate the own vehicle.

The first exemplary embodiment works to produce effects as follows;

(1) The driving assisting system 1 calculates risk potential RP associated with the own vehicle based on the vehicle state of the own vehicle and the running environment around it. Based on the calculated risk potential RP, the driving assisting system 1 calculates an accelerator pedal reaction force instruction value FA for a reaction force to be transmitted to the driver from the accelerator pedal 90. Further, the driving assisting system 1 estimates driver's intention to drive the own vehicle and corrects the reaction force from the accelerator pedal 90 based on the estimated driver's intention. The controller 50 judges how strong necessity to accelerate the own vehicle is immediately after or upon estimating a predetermined driver's intention, and recorrects the reaction force from the accelerator pedal 90 based on the strength of the necessity. This control makes it possible to produce an appropriate accelerator pedal reaction force based on the necessity to accelerate the own vehicle upon estimating the predetermined driver's intention, thereby carrying out a reaction force control that suits the driver's feeling. In concrete terms, as the accelerator pedal reaction force is corrected and recorrected immediately after or upon estimating driver's intention to change to the adjacent lane, it is now possible to carry out a reaction force control that suits the driver's feeling based on the necessity to accelerate when the own vehicle needs to pass the preceding vehicle.

(2) The controller 50 corrects the reaction force by correcting the accelerator pedal reaction force instruction value FA in response to the risk potential RP. This makes it possible to carry out the reaction force control that suits the driver's feeling by directly correcting the accelerator pedal reaction force.

(3) The controller 50 measures an increase $\Delta Td$ in driver torque request immediately after or upon estimating driver's intention to change to the adjacent lane to judge whether or not there is necessity for acceleration of the own vehicle. This makes it possible to surely detect how strongly the driver demands acceleration.

(4) The controller 50 cancels the accelerator pedal reaction force release to be carried out immediately after or upon estimating driver's intention to change to the adjacent lane if an increase $\Delta Td$ in driver torque request is less than or equal to a predetermined value tdo1, and makes recorrection to assume a reaction force that is determined upon estimating the driver's intention to change to the adjacent lane. This makes it possible to carry out appropriate reaction force control without unnecessary acceleration by maintaining the accelerator pedal reaction force when it is judged that there is no necessity for acceleration of the own vehicle.

(5) As shown in FIG. 7, the controller 50 performs a recorrection such that the accelerator pedal reaction force corrected instruction value FAc is larger when an increase $\Delta Td$ in driver torque request is small than it is when the increase $\Delta Td$ is large. This makes it possible to carry out appropriate reaction force control that suits the driver's feeling by reducing the accelerator pedal reaction force gradually when it is judged that necessity for acceleration of the own vehicle is low.

(6) The controller 50 uses a variation amount of accelerator pedal operation amount S over a predetermined period of time after estimating driver's intention to change to the adjacent lane as an increase $\Delta Td$ in driver torque request. Accordingly, it is possible to directly detect the magnitude of driving torque which the driver wishes to impart to the own vehicle.

Second Exemplary Embodiment

Figure 8:
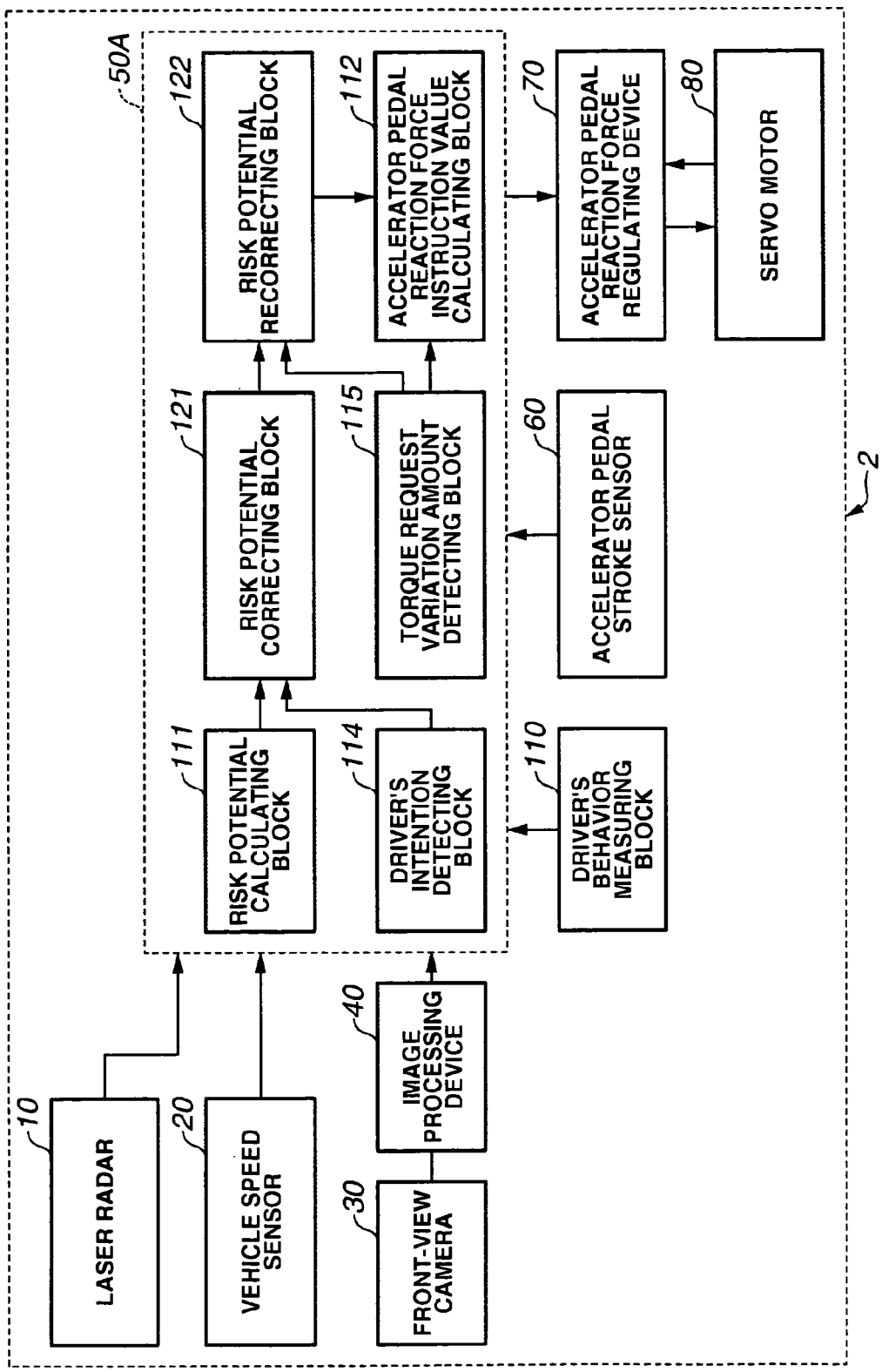
FIG. 8 is a block diagram showing the constituent elements of a second exemplary embodiment of a driving assisting system for a vehicle according to the present disclosure.

The second exemplary embodiment of a driving assisting system for a vehicle is described. FIG. 8 is a block diagram showing the constituent elements of the second exemplary embodiment of a driving assisting system 2 for a vehicle according to the present disclosure. Like reference numerals are used to denote like parts or portions throughout FIGS. 1, 2 and 8. In the following description on the second exemplary embodiment, only differences from the first exemplary embodiment are described.

In the second exemplary embodiment, a controller 50A is provided with a risk potential calculating device 111, a risk potential correcting device 121, a risk potential recorrecting device 122, a driver's intention detecting device 114, a torque request variation amount detecting device 115, and an accelerator pedal reaction force instruction value calculating device 112. The risk potential correcting device 121 corrects risk potential RP associated with the own vehicle based on a driver's intention estimated by the driver's behavior detecting device 114. The risk potential recorrecting device 122 recorrects or corrects again the corrected risk potential RPc based on an increase ΔTd in driver torque request provided by the torque request variation amount detecting device 115 to give a recorrected risk potential RPcc.

Figure 9:
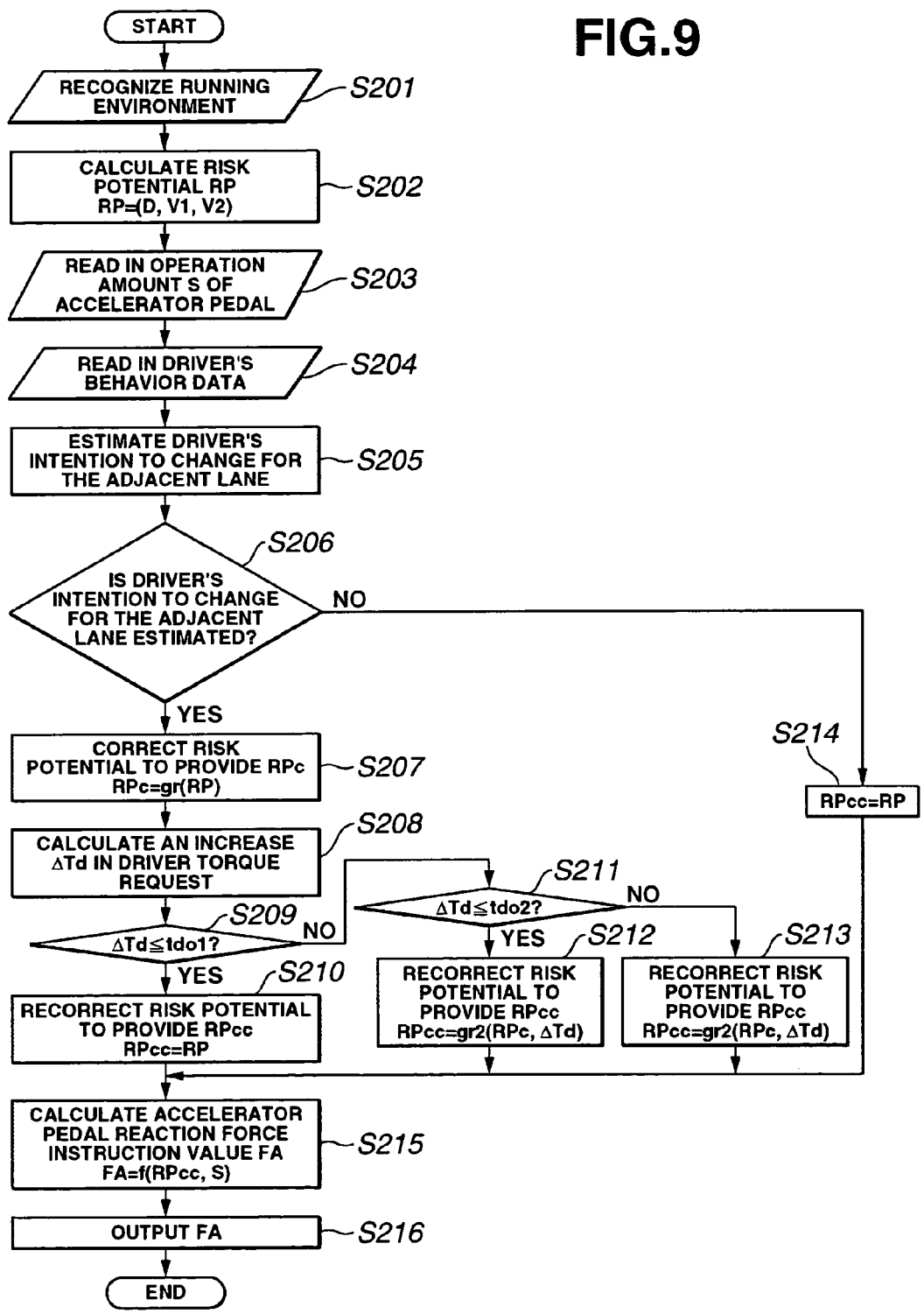
FIG. 9 is a flow chart illustrating a driving assisting control program according to the second exemplary embodiment.

Referring to FIG. 9, the following sections provide detailed descriptions on how the second exemplary embodiment works. FIG. 9 is a flow chart illustrating steps of a driving assisting control program stored and executed by the controller 50A. Execution of this control program is repeated at regular intervals of, for example, 50 milliseconds. Description on steps S201 to S203 is hereby omitted because steps S201 to S203 in FIG. 9 exactly correspond to steps S102 to S103 in FIG. 4, respectively.

Step S204 is provided to read in, as driver's behavior data, an ON or OFF signal indicative of a state of turn signal indicators provided by the driver's behavior measuring device 110. Step S205 is provided to estimate driver's intention based on the driver's behavior data obtained at step S204. Step S206 is provided to judge whether or not driver's intention to change to the adjacent lane has been estimated. If driver's intention to change to the adjacent lane has been estimated, the logic proceeds to step S207.

Step S207 is provided to correct the risk potential RP calculated in step S202. In concrete terms, calculating a first-order delay-filter reduces the risk potential RP, which was obtained immediately after or upon estimating the driver's intention to change to the adjacent lane, to give the result as a corrected risk potential RPc. Using a predetermined time constant Tsr and a coefficient a, the risk potential RPc may be expressed as:

$$RPc = gr(RP) \quad \text{(Eq. 6)}$$
$$= k \times 1/(1 + a \times Tsr) \times RP$$

where: k is a constant gain factor determining the level of pedal force reduction. Tsr is a time constant of first order filter and affect how quickly pedal force would be reduced. For instance, 1.0 sec could be used. Constant a is a delay time associated with Tsr and may have a value 1.0.

The next step S208 is provided to calculate an increase ΔTd in driver torque request, which is indicative of how strongly the driver demands acceleration. In this exemplary embodiment, the increase ΔTd in driver torque request is an increase in an operation amount S of the accelerator pedal 90 over a predetermined period of time immediately after driver's intention to change to the adjacent lane has been estimated.

Step S209 is provided to judge whether or not the increase ΔTd in driver torque request is less than or equal to a predetermined value tdo1. If ΔTd≦tdo1, the logic goes to step S210. Step S210 is provided to set the risk potential RP already obtained at step S202 upon estimation of driver's intention to change to the adjacent lane as a recorrected risk potential RPcc (RPcc=RP) because there is no need for acceleration accounting for the fact that the increase ΔTd in driver torque request is small.

If the interrogation at step S209 results in negative, the logic goes to step S211 where a judgment is made whether or not the increase ΔTd is less than or equal to another predetermine value tdo2 (>tdo1). If the interrogation at step S211 results in affirmative, that is, tdo1<ΔTd≦tdo2, the logic goes to step S212. Step S212 is provided to recorrect or correct again the corrected risk potential RPc obtained at step S207 in response to the increase ΔTd in driver torque request (obtained at step S208). First, a coefficient Krtd that is multiplied with the time constant Tsr is set in response to the increase ΔTd in driver torque request.

Figure 10:
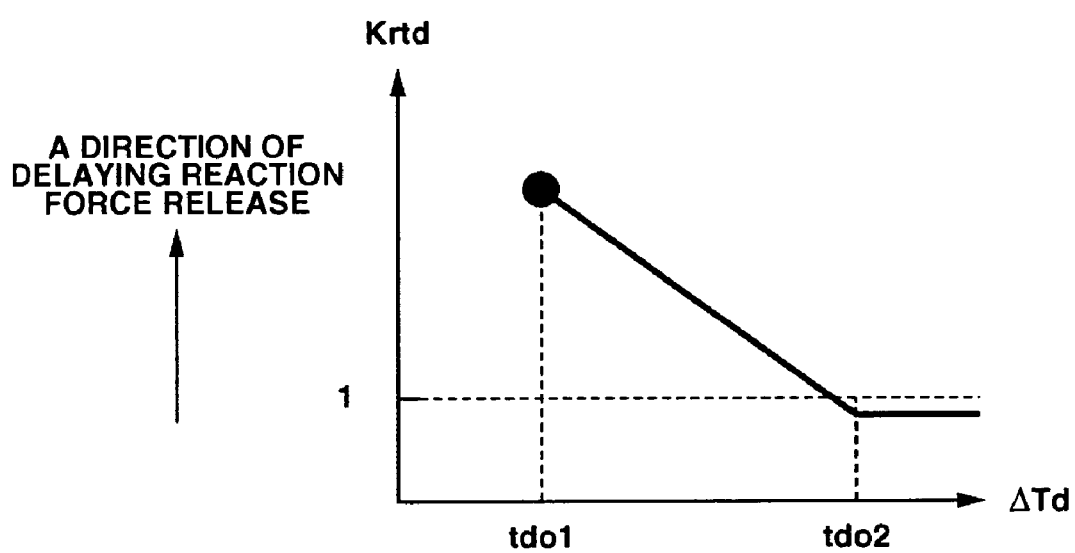
FIG. 10 shows the relationship between an increase in driver torque request and a coefficient for a time constant used to correct risk potential.

If tdo1<ΔTd≦tdo2, the accelerator pedal reaction force is released gradually based on a determination that the less the increase ΔTd in driver torque request, the less the necessity for accelerating the vehicle is. This gradual release is controlled by increasing a time constant term (Krtd×a×Tsr) for risk potential correction by increasing the coefficient Krtd as the increase ΔTd in driver torque request becomes less as shown in FIG. 10.

Using the correction coefficient Krtd that varies with the increase ΔTd in driver torque request, the corrected risk potential RPc is recorrected (corrected again) to provide a recorrected risk potential RPcc. The recorrected risk potential RPcc may be expressed as:

$$RPcc = gr2(RPc) \quad \text{(Eq. 7)}$$
$$= k \times 1/(1 + Krtd \times a \times Tsr) \times RPc$$

where: k is a constant gain factor determining the level of pedal force reduction. Tsr is a time constant of first order filter and affect how quickly pedal force would be reduced. For instance, 1.0 sec could be used. Krtd and a are delay time associated with Tsr and may have a respective value of 1.0.

If the interrogation at step S211 results in negative, that is, ΔTd>tdo2, the logic goes to step S213. The step S213 is provided to recorrect (correct again) the corrected risk potential RPc using the above mentioned equation Eq. 7. Measurement of an increase ΔTd in driver torque request precedes beginning of release of accelerator pedal reaction force, so that a delay for the measurement is inevitable. Accounting for this inevitable delay, the coefficient Krtd is set less than 1 (Krtd<1) against the increase ΔTd, which is greater than tdo2, as shown in FIG. 10, to shorten time that elapses from estimating of driver's intention to change to the adjacent lane to beginning of release (beginning of reduction) of accelerator pedal reaction force.

If the interrogation at step S206 results in negative, the logic goes to step S214. This is the case when driver's intention to change to the adjacent lane has not been estimated. Step S214 is provided to set the risk potential RP obtained at step S202 as the recorrected risk potential RPcc Step S215 is provided to calculate an accelerator pedal reaction force instruction value FA based on the corrected risk potential RPcc obtained at step S210 or step S212 or step S213 or step S214. Similarly to step S104 in FIG. 4, an increase ΔF in reaction force is calculated in response to the recorrected risk potential RPcc using the relationship shown in FIG. 5. The relationship shown in FIG. 5 may be used by substituting RPcc for RP. Referring to FIG. 5, for values of the recorrected risk potential RPcc not less than a predetermined minimum value RPmin, an increase ΔF in reaction force grows exponentially with the recorrected risk potential RPcc as expressed by the before-mentioned equation Eq. 3. Adding this increase ΔF in reaction force to a value given by the ordinary varying characteristic of reaction force with operation amount S of the accelerator pedal gives an accelerator pedal reaction force instruction value FA.

Step S216 is provided to output the accelerator pedal reaction force instruction value FA obtained at step S215. After step S216, the present execution comes to an end. The controller 50A feeds this accelerator pedal reaction force instruction value FA to the accelerator pedal reaction force regulating device 70. The accelerator pedal reaction force regulating device 70 varies accelerator pedal reaction force with different instruction values FA in proportional relationship by controlling the servo motor 80.

The second exemplary embodiment works to provide effects as follows:

The controller 50A corrects the reaction force applied to the accelerator pedal 90 by correcting the risk potential reflecting running environment around the own vehicle. If the necessity for acceleration is low when the driver is driving the own vehicle at a constant speed during approaching and passing the preceding vehicle, it may be considered that a risk perceived by the driver is low. Correcting the risk potential RP with the necessity for acceleration provides a solution to tailor the risk potential RP to the degree of risk perceived by the driver. The second exemplary embodiment provides the same effect as the first exemplary embodiment by correcting the risk potential RP.

Third Exemplary Embodiment

Figure 11:
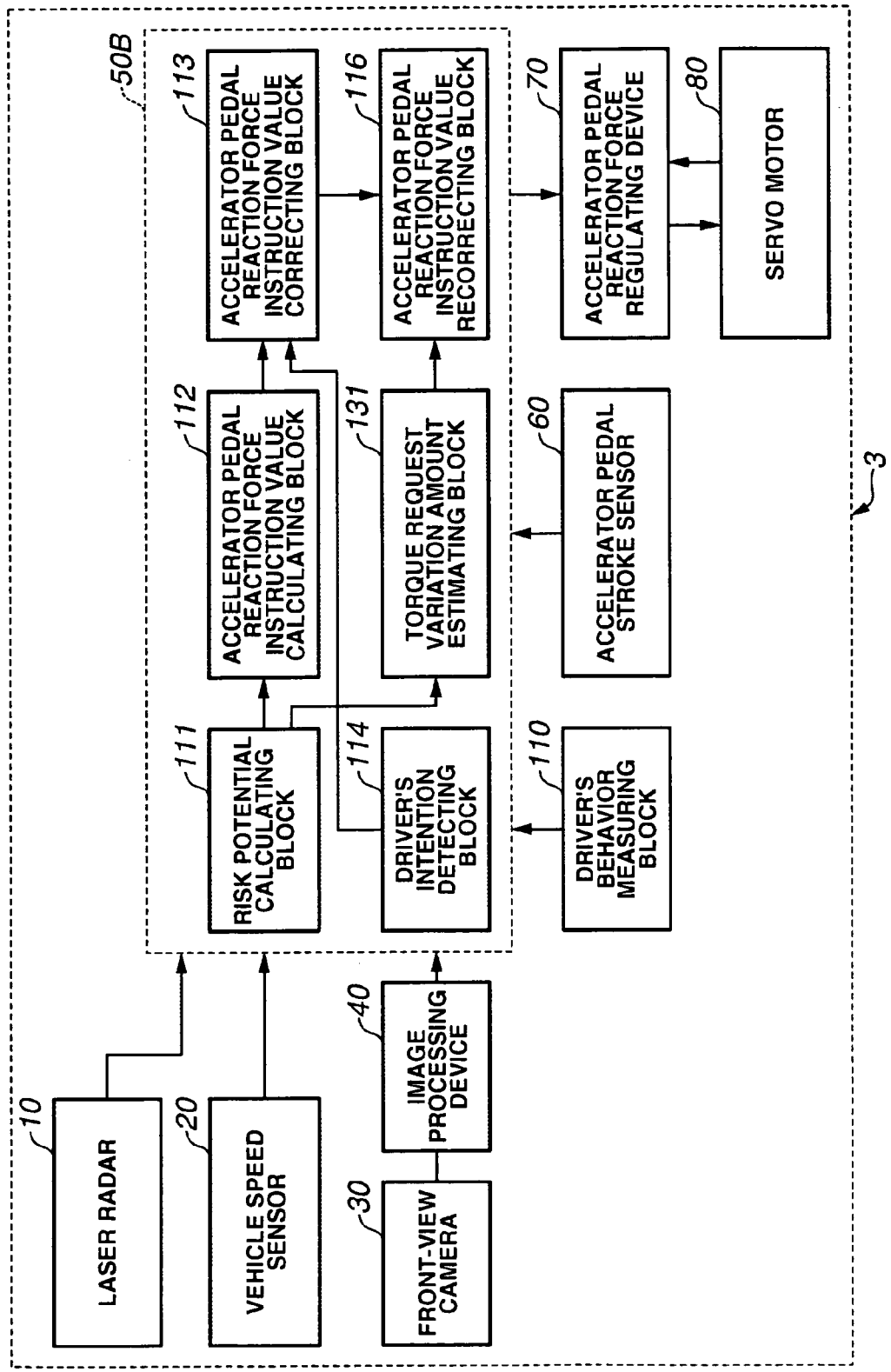
FIG. 11 is a block diagram showing the constituent elements of a third exemplary embodiment of a driving assisting system for a vehicle according to the present disclosure.

The third exemplary embodiment of a driving assisting system for a vehicle is described. FIG. 11 is a block diagram showing the constituent elements of the third exemplary embodiment of a driving assisting system 3 for a vehicle according to the present disclosure. Like reference numerals are used to denote like parts or portions throughout FIGS. 1, 2 and 11. In the following description on the third exemplary embodiment, only differences from the first exemplary embodiment are described.

In the third exemplary embodiment, a controller 50B is provided with a risk potential calculating device 111, an accelerator pedal reaction force instruction value calculating device 112, an accelerator pedal reaction force instruction value correcting device 113, a driver's intention detecting device 114, a torque request variation amount estimating device 131, and an accelerator pedal reaction force instruction value recorrecting device 112. The torque request variation amount estimating device 131 estimates an increase in driver torque request based on the degree to which the own vehicle is approaching the preceding vehicle. The accelerator pedal reaction force instruction value recorrecting device 116 recorrects or correct again an accelerator pedal reaction force corrected instruction value FAc using the estimated increase in driver torque request.

Figure 12:
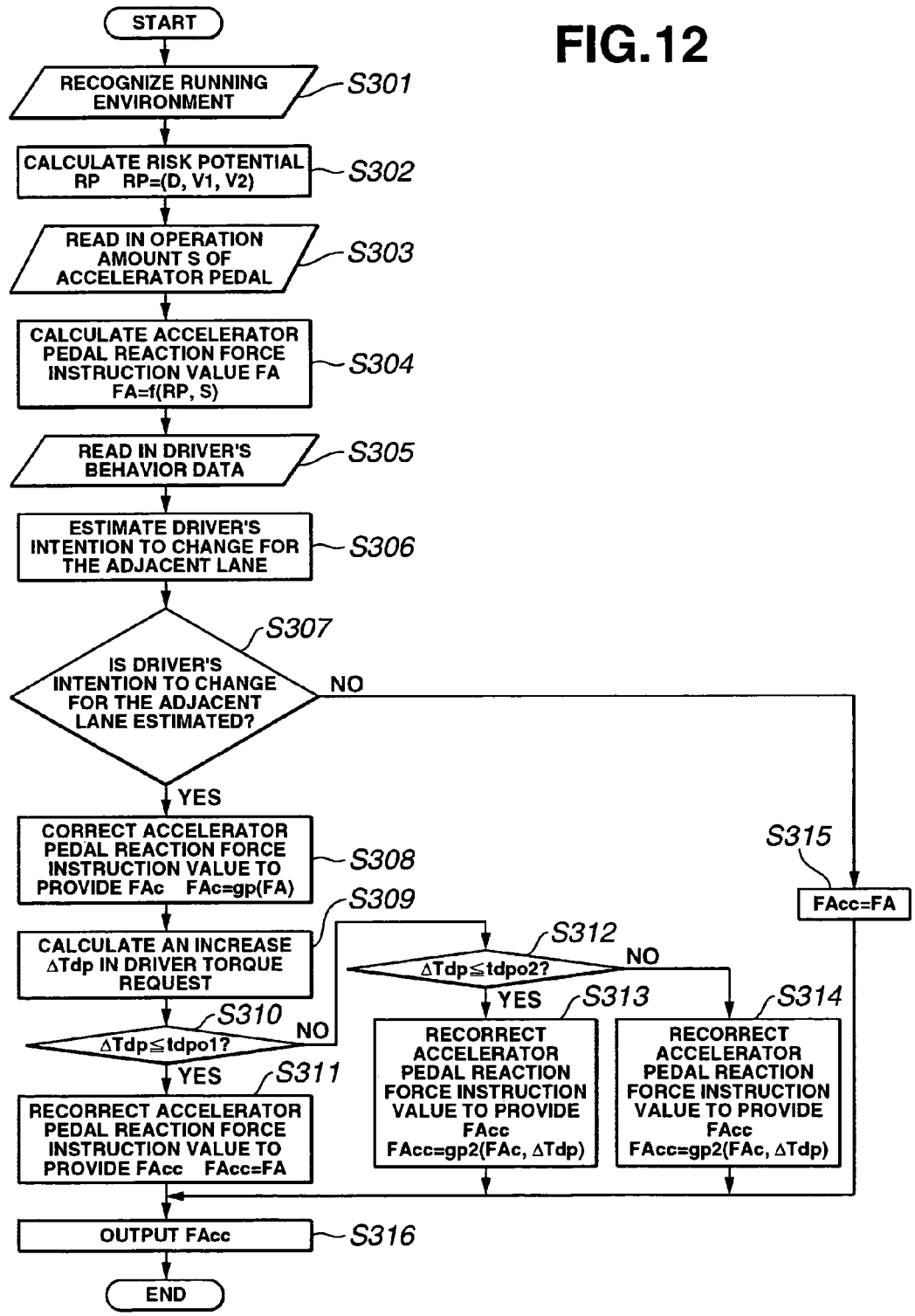
FIG. 12 is a flow chart illustrating a driving assisting control program according to the third exemplary embodiment.

Referring to FIG. 12, the following sections provide detail description how the third exemplary embodiment works. FIG. 12 is a flow chart illustrating steps of a driving assisting control program stored and executed by the controller 50B. Execution of this control program is repeated at regular intervals of, for example, 50 milliseconds. Description on steps S301 to S308 is hereby omitted because steps S301 to S308 in FIG. 12 exactly correspond to steps S101 to S108 in FIG. 4, respectively.

At step S309, the torque request variation amount estimating device 131 estimates an increase in driver torque request based on a degree to which the own vehicle is approaching the preceding vehicle. In this exemplary embodiment, an estimate of an increase in driver torque request is called an estimated increase $\Delta Tdp$ in driver torque request. The estimated increase $\Delta Tdp$ in driver torque request is indicative of a need for acceleration immediately after driver's intention to change to the adjacent lane has been estimated. The estimated increase $\Delta Tdp$ is calculated based on, for example, a relative speed Vr between the own vehicle and the preceding vehicle.

Figure 13:
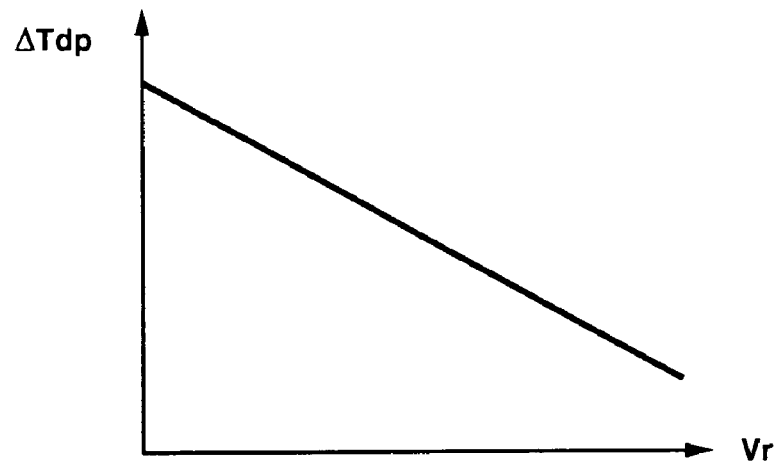
FIG. 13 is shows the relationship between an estimated increase in driver torque request and a relative speed.

In this case, the relative speed Vr indicates the degree to which the own vehicle is approaching the preceding vehicle. FIG. 13 shows the relationship between the relative speed Vr and the estimated increase $\Delta Tdp$ in driver torque request.

As shown FIG. 13, the larger the relative speed Vr (equals to the own vehicle speed V1–the preceding vehicle speed V2), the less the estimated increase $\Delta Tdp$ in driver torque request is set. That is, the higher the own vehicle speed is with respect to the preceding vehicle speed, the less the necessity for acceleration during the overtaking for preceding vehicle. Accordingly, the driver torque request is set small.

Step S310 is provided to judge whether or not the estimated increase $\Delta Tdp$ in driver torque request is less than or equal to a predetermined value tdo1. If $\Delta Tdp \leq tdo1$, the logic goes to step S311. Step S311 is provided to set the accelerator pedal reaction force instruction value FA already obtained at step S304 upon estimation of driver's intention to change to the adjacent as an accelerator pedal reaction force recorrected instruction value FAcc (FAcc=FA) because there is no need for acceleration accounting for the fact that the estimated increase $\Delta Tdp$ in driver torque request is small. This accelerator pedal reaction force instruction value FA determined upon estimation of driver's intention to change to the adjacent lane is held for use as the recorrected instruction value FAcc until completion of change to the adjacent lane.

Figure 14:
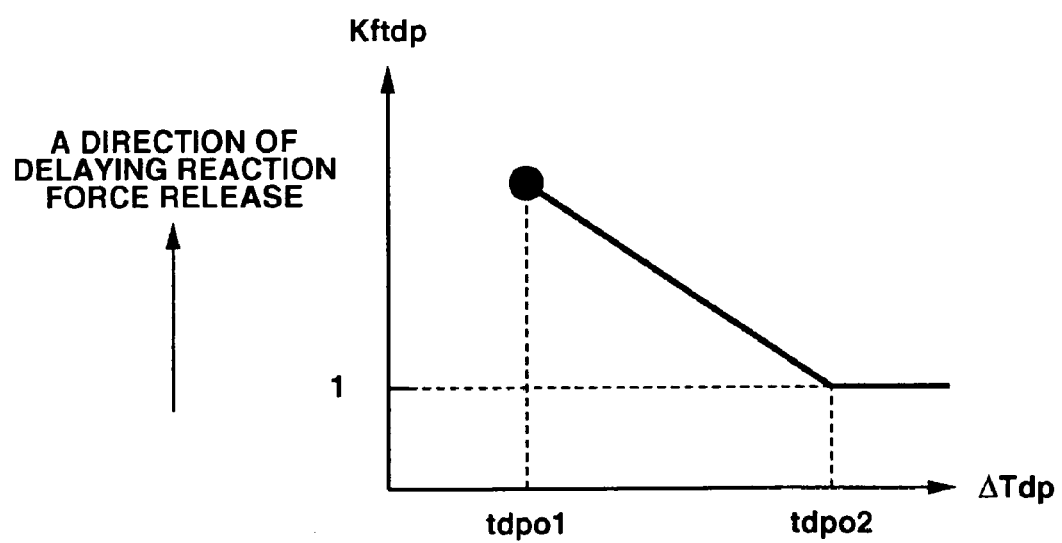
FIG. 14 shows the relationship between an estimated increase in driver torque request and a coefficient for a time constant used to correct accelerator pedal reaction force.

If the interrogation at step S310 results in negative, the logic goes to step S312 where a judgment is made whether or not the estimated increase $\Delta Tdp$ is less than or equal to another predetermine value tdo2 (>tdo1). If the interrogation at step S312 results in affirmative, that is, $tdo1 < \Delta Tdp \leq tdo2$, the logic goes to step S313. Step S313 is provided to recorrect or correct again the accelerator pedal reaction force corrected instruction value FAc obtained at step S308 in response to the estimated increase $\Delta Tdp$ in driver torque request (obtained at step S309). First, a coefficient multiplied by the time constant Tsf is set in response to the estimated increase $\Delta Tdp$ in driver torque request. This coefficient is indicated at Kftdp If $tdo1 < \Delta Tdp \leq tdo2$, the accelerator pedal reaction force is released gradually based on a determination that the less the estimated increase $\Delta Tdp$ in driver torque request, the less the necessity for accelerating the vehicle is. This gradual release is controlled by increasing a time constant term (Kftdp×a× Tsf) for accelerator pedal reaction force correction by increasing the coefficient Kftdp as the estimated increase $\Delta Tdp$ in driver torque request becomes less as shown in FIG. 14.

Using the coefficient Kftdp that varies in response to the estimated increase $\Delta Td$ in driver torque request, the accelerator pedal reaction force corrected instruction value FAc is recorrected (corrected again) to provide an accelerator pedal reaction force recorrected instruction value FAcc. The recorrected instruction value FAcc may be expressed by the before-mentioned equation Eq. 5 as modified by substituting Kftdp for Kftd.

If the interrogation at step S312 results in negative, that is, $\Delta Tdp > tdo2$, the logic goes to step S314. The step S314 is provided to recorrect (correct again) the accelerator pedal reaction force corrected instruction value FAc using the above mentioned modified equation Eq. 5. Accounting for the inevitable delay needed in the first exemplary embodiment for measurement of the operation amount S of the accelerator pedal is no longer necessary in the third exemplary embodiment. Accordingly, the coefficient Kftdp is set equal to 1 (Kftdp=1) against the estimated increase $\Delta Tdp$, which is greater than tdo2, as shown in FIG. 14.

If the interrogation at step S307 results in negative, the logic goes to step S315. This is the case when driver's intention to change to the adjacent lane has not been estimated. Step S315 is provided to set the accelerator pedal reaction force instruction value FA obtained at step S304 as the recorrected instruction value FAcc.

Step S316 is provided to output the accelerator pedal reaction force recorrected instruction value FAcc that is obtained at step S311 or step S313 or step S314 or step S315. After step S316, the present execution comes to an end. The controller 50B feeds this accelerator pedal reaction force recorrected instruction value FAcc to the accelerator pedal reaction force regulating device 70. The accelerator pedal reaction force regulating device 70 varies accelerator pedal reaction force with different instruction values FAcc in proportional relationship by controlling the servo motor 80.

Figure 15:
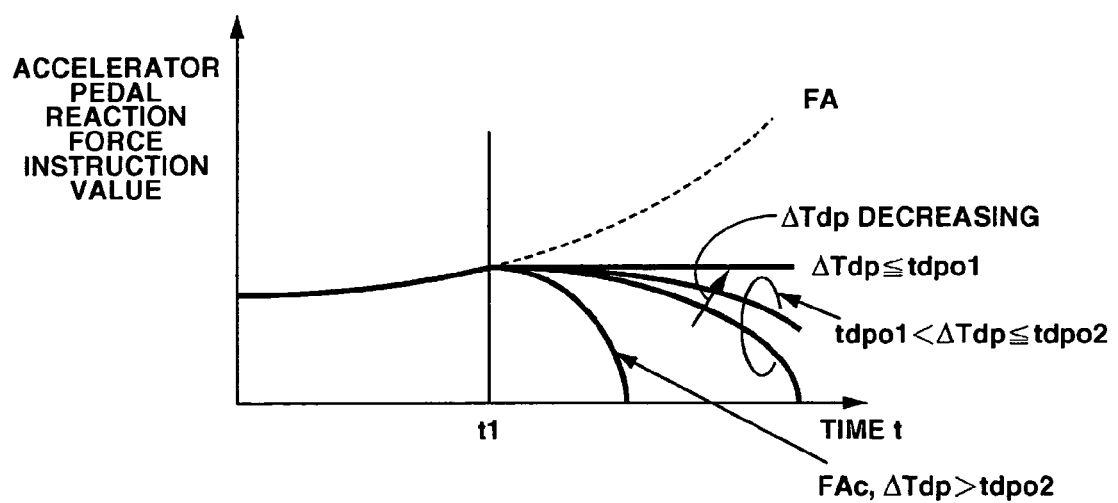
FIG. 15 illustrates how the third exemplary embodiment works.

Referring to FIG. 15, an operation of the third exemplary embodiment is described. FIG. 15 shows changes of accelerator pedal reaction force instruction value with time when the own vehicle passes the preceding vehicle. In FIG. 15, at the moment t1, the driver's intention to change to the adjacent lane is estimated. Until the moment t=t1, accelerator pedal reaction force instruction value continuously varies in accordance with the running environment.

If driver's intention to change to the adjacent lane is not estimated, the accelerator pedal reaction force instruction value FA increases as risk potential RP grows when the own vehicle is approaching the preceding vehicle. Immediately after or upon estimating driver's intention to change to the adjacent lane at the moment t=t1, the accelerator pedal reaction force instruction value FA is corrected to provide the result as an accelerator pedal reaction force corrected instruction value FAc. The corrected instruction value FAc reduces with the first-order delay-filter.

The accelerator pedal reaction force corrected instruction value FAc is recorrected in various manners depending on different strengths that the driver has upon accelerating the own vehicle. If an estimated increase ΔTdp in driver torque request obtained immediately after or upon estimating driver's intention to change to the adjacent lane is less than or equal to the predetermined value tdo1, the accelerator pedal reaction force instruction value FA obtained at the moment (t=t1) upon estimating the driver's intention to change to the adjacent lane is held. This logic works in a traffic scene when the own vehicle is approaching the preceding vehicle at the same vehicle speed and then passing it without any necessity to accelerate the own vehicle. In this traffic scene, canceling the release of accelerator pedal reaction force maintains equilibrium state between a force with which the driver depresses the accelerator pedal 90 and a reaction force transmitted to the driver via the accelerator pedal 90.

If tdo1<ΔTdp≦tdo2, the less the estimated increase ΔTdp in driver torque request, the more the accelerator pedal reaction force is released gradually because a need to accelerate the own vehicle remains small. This logic works to prevent a rapid reduction in the accelerator pedal reaction force immediately after or upon estimation of driver's intention to change to the adjacent lane, thereby allowing the driver to carry out an appropriate control to realize his intention by restraining the driver from depressing deeply unintentionally. If ΔTdp>tdo2, there is a strong need to accelerate the own vehicle and the accelerator pedal reaction force is quickly released to allow the driver to carry out a smooth driving operation in accordance with his/her intention to accelerate the own vehicle.

In the preceding description on the third exemplary embodiment, the estimated increase ΔTdp in driver torque request is calculated based on the relative speed Vr between the own vehicle and the preceding vehicle. The relative speed Vr is one of various parameters that may indicate the degree to which the own vehicle is approaching the preceding vehicle. Thus, other parameters may be used to calculate the estimated increase ΔTdp in driver torque request. For example, a time to contact TTC or the time derivative ΔRP of the risk potential RP may be used as the degree to which the own vehicle is approaching the preceding vehicle.

Figure 16:
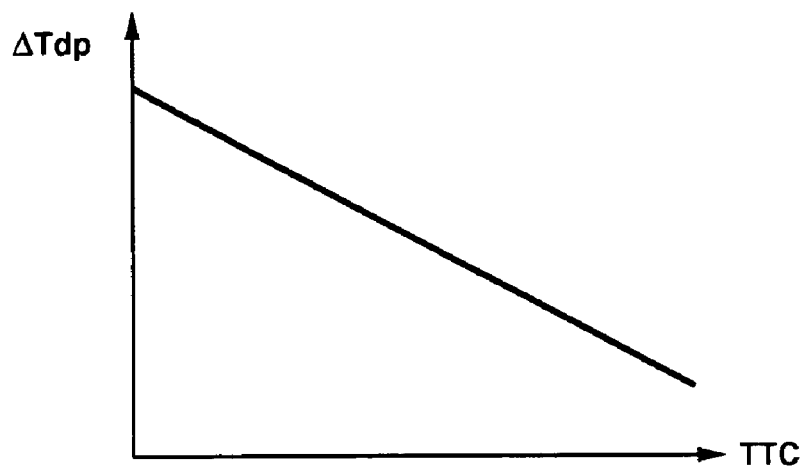
FIG. 16 shows the relationship between a time to contact with the preceding vehicle and an estimated increase in driver torque request.
Figure 17:
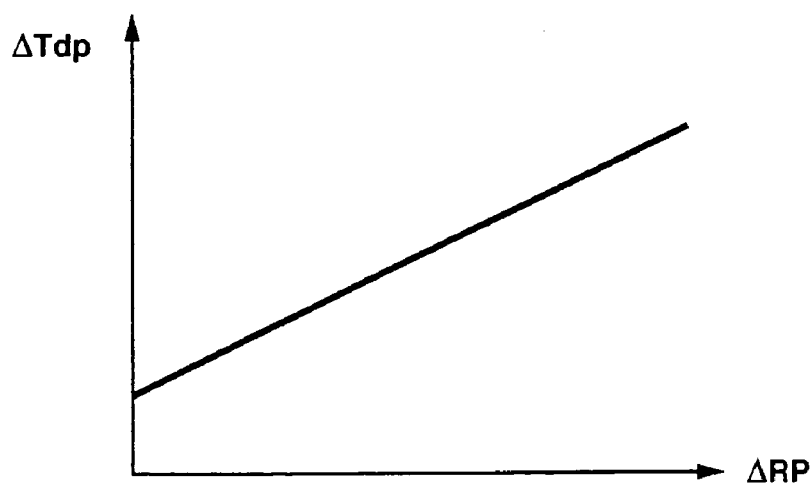
FIG. 17 shows the relationship the time derivative of risk potential and an estimated increase in driver torque request.

FIG. 16 shows the relationship between the time to contact TTC and the estimated increase ΔTdp in driver torque request. As the necessity for acceleration is considered to be weak when the time to contact TTC is long, the longer the time to contact TTC, the less the estimated increase ΔTdp in driver torque request is. FIG. 17 shows the relationship between the time derivative ΔRP of the risk potential RP and the estimated increase ΔTdp in driver torque request. As the necessity for acceleration is considered to be weak when the time derivative ΔRP of the risk potential RP is small, the smaller the time derivative ΔRP of the risk potential, the less the estimated increase ΔTdp is.

In addition to the effects provided by the first exemplary embodiment, the third exemplary embodiment works to produce effects as follows:

(1) In order to judge the necessity for acceleration, the controller 50B estimates an increase in driver torque request upon estimating driver's intention to change to the adjacent lane to calculate an estimated increase ΔTdp in driver torque request. This makes it possible to detect how strongly the driver demands acceleration.

(2) The controller 50B cancels the accelerator pedal reaction force release to be carried out immediately after or upon estimating the driver's intention to change to the adjacent lane if the estimated increase ΔTdp in driver torque request is less than or equal to a predetermined value tdo1, and makes a recorrection to hold a reaction force that is produced upon estimating the driver's intention to change to the adjacent lane. This makes it possible to carry out appropriate reaction force control without unnecessary acceleration by maintaining the accelerator pedal reaction force when it is judged that there is no necessity for acceleration of the own vehicle.

(3) As shown in FIG. 15, the controller 50B makes a recorrection such that the accelerator pedal reaction force corrected instruction value FAc is larger when the estimated increase ΔTdp in driver torque request is small than it is when the estimated increase ΔTdp is large. This makes it possible to carry out an appropriate reaction force control that suits the driver's feeling by reducing the accelerator pedal reaction force gradually when it is judged that the necessity for acceleration of the own vehicle is low.

(4) The controller 50B calculates the estimated increase ΔTdp based on the degree to which the own vehicle is approaching the preceding vehicle. Accordingly, it is possible to directly detect the magnitude of driving torque which the driver wishes to impart to the own vehicle.

(5) The degree to which the own vehicle is approaching the preceding vehicle is used to calculate the estimated increase ΔTdp. In estimating a degree to which the own vehicle is approaching the preceding vehicle, at least one of the relative speed Vr between the own vehicle and the preceding vehicle, the time to contact TTC to the preceding vehicle, and the time derivative ΔRP of the risk potential RP is used. This makes it possible to judge the necessity for acceleration based on the relative relationship between the own vehicle and the preceding vehicle.

Fourth Exemplary Embodiment

Figure 18:
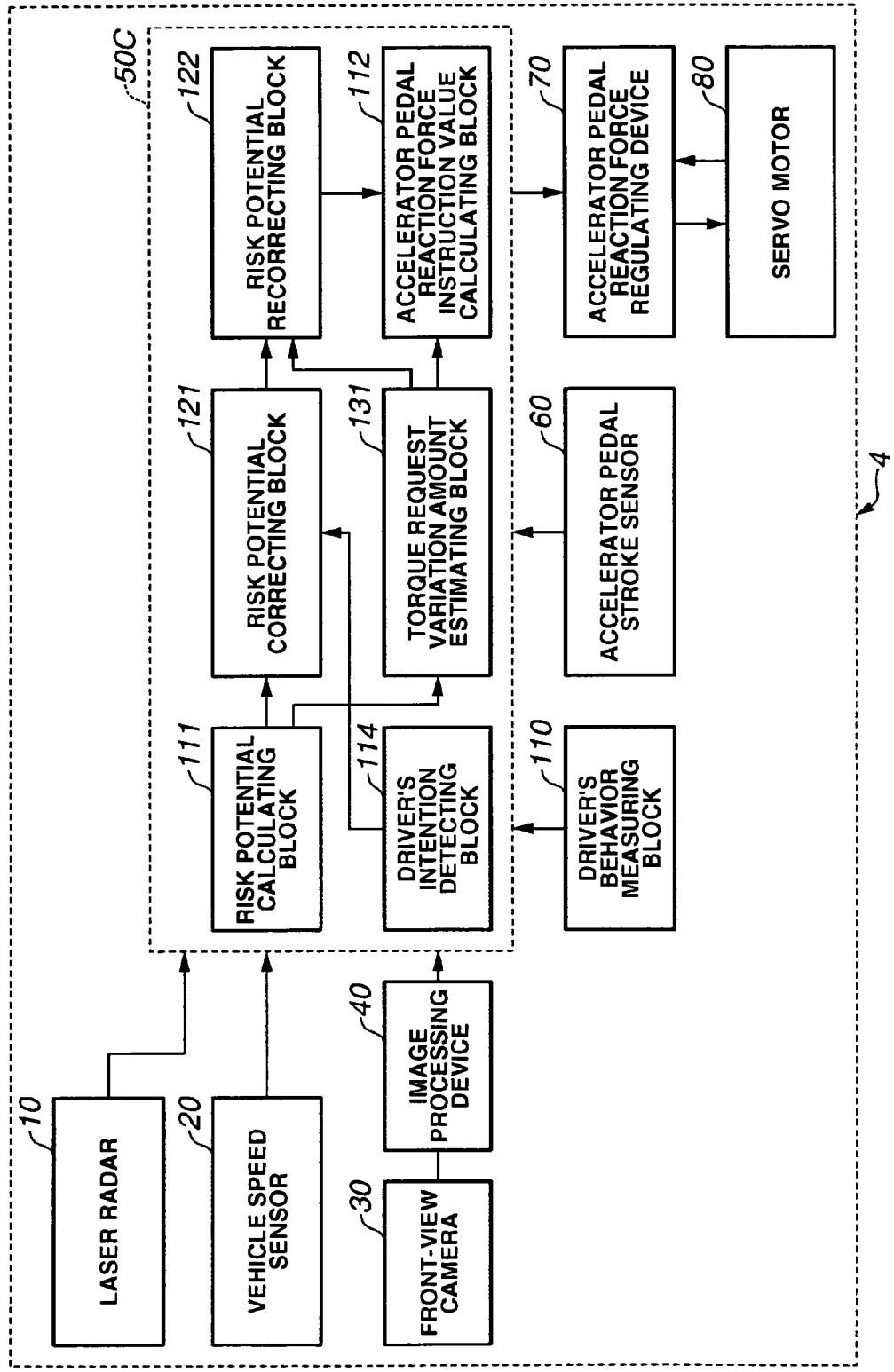
FIG. 18 is a block diagram showing the constituent elements of a fourth exemplary embodiment of a driving assisting system for a vehicle according to the present disclosure.

The fourth exemplary embodiment of a driving assisting system for a vehicle is described. FIG. 18 is a block diagram showing the constituent elements of the fourth exemplary embodiment of a driving assisting system 4 for a vehicle according to the present disclosure. Like reference numerals are used to denote like parts or portions throughout FIGS. 1, 2 and 18. In the following description on the fourth exemplary embodiment, differences from the first exemplary embodiment only are described.

In the fourth exemplary embodiment, a controller 50C is provided with a risk potential calculating device 111, a risk potential correcting device 121, a risk potential recorrecting device 122, a driver's intention detecting device 114, a torque request variation amount estimating device 131, and an accelerator pedal reaction force instruction value calculating device 112. The torque request variation amount estimating device 131 estimates an increase in driver torque request based on the degree to which the own vehicle is approaching the preceding vehicle. The risk potential correcting device 121 corrects risk potential RP associated with the own vehicle based on driver's intention estimated by the driver's behavior detecting device 114. The risk potential recorrecting device 122 recorrects or corrects again the corrected risk potential RPc based on the estimated increase $\Delta$Tdp in driver torque request provided by the torque request variation amount estimating device 131 to give a recorrected risk potential RPcc.

Figure 19:
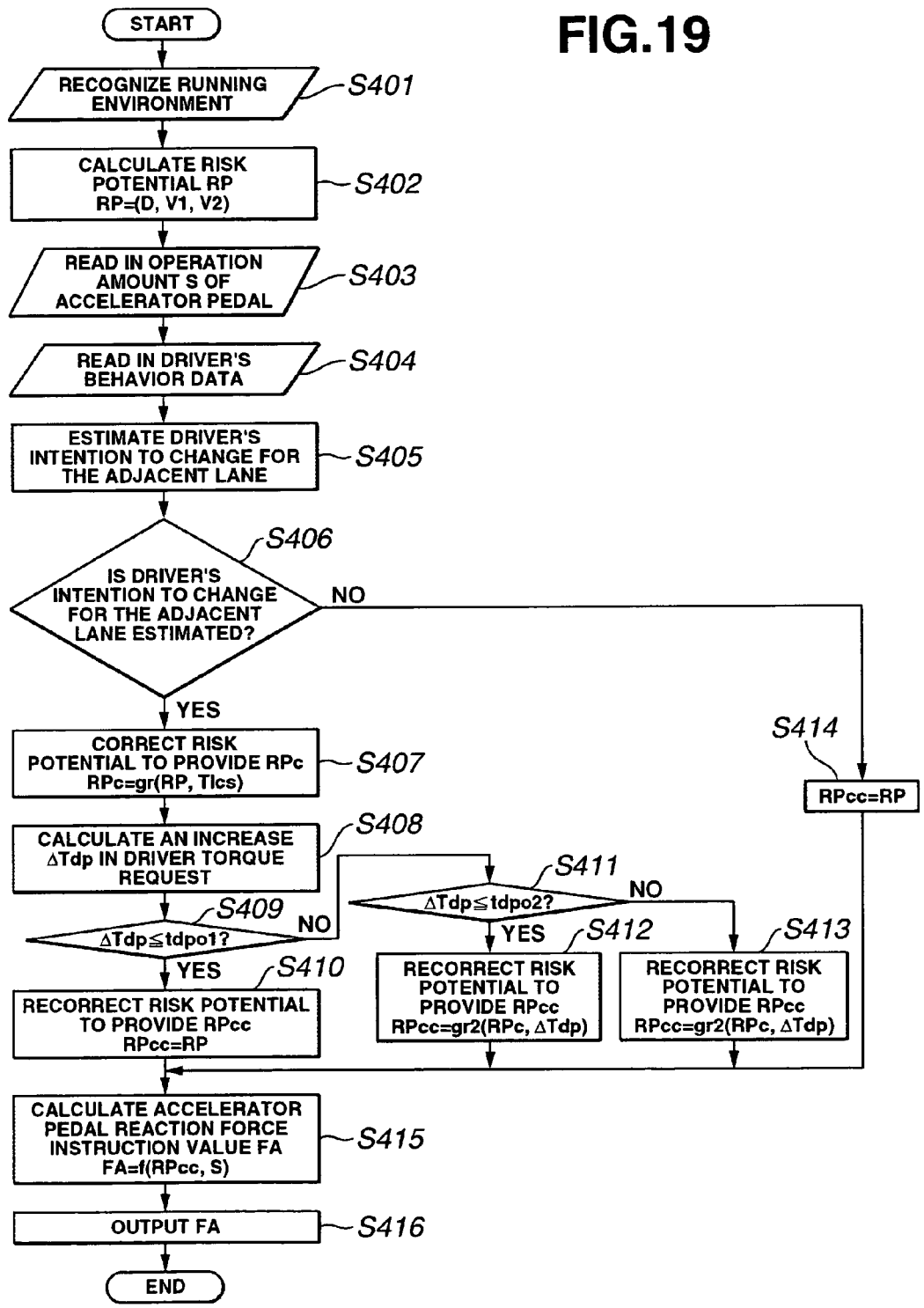
FIG. 19 is a flow chart illustrating a driving assisting control program according to the fourth exemplary embodiment.

Referring to FIG. 19, the following sections provide detailed descriptions on how the fourth exemplary embodiment works. FIG. 19 is a flow chart illustrating steps of a driving assisting control program stored and executed by the controller 50C. Execution of this control program is repeated at regular intervals of, for example, 50 milliseconds. Description on steps S401 to S403 is hereby omitted because steps S401 to S403 in FIG. 19 exactly correspond to steps S102 to S103 in FIG. 4, respectively.

Step S404 is provided to read in, as driver's behavior data, an ON or OFF signal indicative of a state of turn signal indicators provided by the driver's behavior measuring device 110. Step S405 is provided to estimate driver's intention based on the driver's behavior data obtained at step S404. Step S406 is provided to judge whether or not driver's intention to change to the adjacent lane has been estimated. If driver's intention to change to the adjacent lane has been estimated, the logic proceeds to step S407.

Step S407 is provided to correct the risk potential RP calculated by step S402. In concrete terms, calculating a first-order delay-filter, as expressed by the before-mentioned equation Eq. 6, reduces the risk potential RP, which was obtained immediately after or upon estimating the driver's intention to change to the adjacent lane, to give the result as a corrected risk potential RPc.

The next step S408 is provided to calculate an estimated increase $\Delta$Tdp in driver torque request based on the degree to which the own vehicle is approaching the preceding vehicle. In this embodiment, similarly to the third exemplary embodiment, at least one of the relative speed Vr, time to contact TTC and time derivative $\Delta$RP of the risk potential RP is used as the degree to which the own vehicle is approaching the preceding vehicle.

Step S409 is provided to judge whether or not the estimated increase $\Delta$Tdp in driver torque request is less than or equal to a predetermined value tdo1. If $\Delta$Tdp$\leq$tdo1, the logic goes to step S410. Step S410 is provided to set the risk potential RP already obtained at step S402 upon estimation of driver's intention to change to the adjacent lane as a recorrected risk potential RPcc (RPcc=RP) because there is no need for acceleration accounting for the fact that the estimated increase $\Delta$Tdp in driver torque request is small.

If the interrogation at step S409 results in negative, the logic goes to step S411 where a judgment is made whether or not the estimated increase $\Delta$Tdp is less than or equal to another predetermine value tdo2 (>tdo1): If the interrogation at step S411 results in affirmative, that is, tdo1<$\Delta$Tdp$\leq$tdo2, the logic goes to step S412. Step S412 is provided to recorrect or correct again the corrected risk potential RPc obtained at step S407 in response to the estimated increase $\Delta$Tdp in driver torque request (obtained at step S408). First, a coefficient Krtdp that is multiplied with the time constant Tsr is set in response to the estimated increase $\Delta$Tdp in driver torque request.

Figure 20:
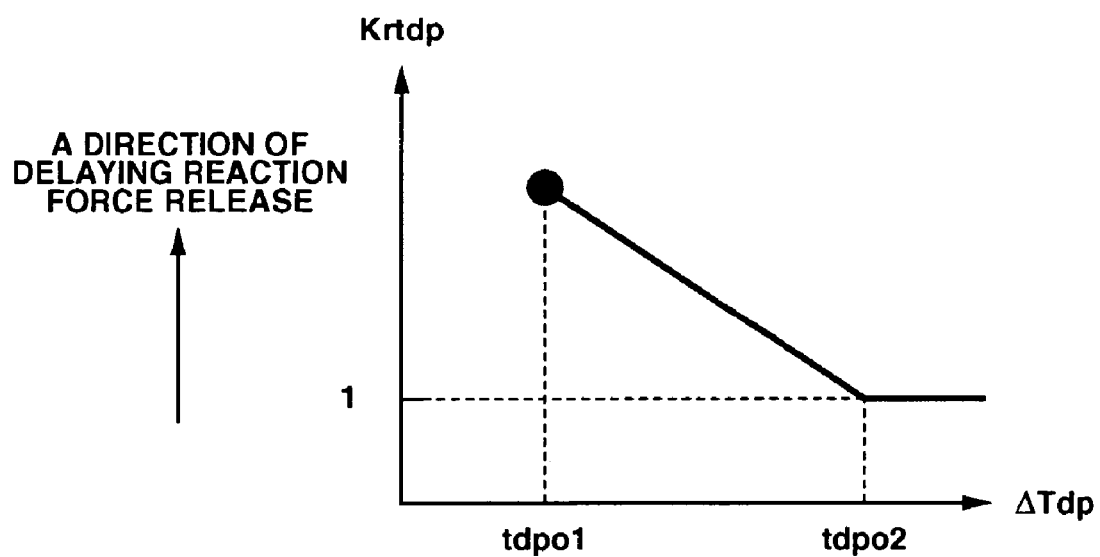
FIG. 20 shows the relationship between an estimated increase in driver torque request and a coefficient for a time constant used to correct risk potential.

If tdo1<$\Delta$Tdp$\leq$tdo2, the accelerator pedal reaction force is released gradually based on determination that the less the estimated increase $\Delta$Tdp in driver torque request, the less the necessity for accelerating the vehicle is. This gradual release is controlled by increasing a time constant term (Krtdp×a× Tsr) for risk potential correction by increasing the coefficient Krtdp as the estimated increase $\Delta$Tdp in driver torque request becomes less as shown in FIG. 20. Using the equation Eq. 7 as modified by substituting Krtdp for Krtd gives a recorrected risk potential RPcc.

If the interrogation at step S411 results in negative, that is, $\Delta$Tdp>tdo2, the logic goes to step S413. The step S413 is provided to recorrect (correct again) the corrected risk potential RPc using the above mentioned modified equation Eq. 7. Accounting for the inevitable delay needed in the first exemplary embodiment for measurement of the operation amount S of the accelerator pedal is no longer necessary in the fourth exemplary embodiment. Accordingly, the coefficient Krtdp is set equal to 1 (Krtdp=1) against the estimated increase $\Delta$Tdp, which is greater than tdo2, as shown in FIG. 20.

If the interrogation at step S406 results in negative, the logic goes to step S414. This is the case when driver's intention to change to the adjacent lane has not been estimated. Step S414 is provided to set the risk potential RP obtained at step S402 as the recorrected risk potential RPcc Step 415 is provided to calculate an accelerator pedal reaction force instruction value FA based on the corrected risk potential RPcc obtained at step S410 or step S412 or step S413 or step S414. Similarly to step S104 in FIG. 4, an increase $\Delta$F in reaction force is calculated in response to the recorrected risk potential RPcc using the relationship shown in FIG. 5. The relationship shown in FIG. 5 may be used by substituting RPcc for RP. Referring to FIG. 5, for values of the recorrected risk potential RPcc not less than a predetermined minimum value RPmin, an increase $\Delta$F in reaction force grows exponentially with the recorrected risk potential RPcc as expressed by the before-mentioned equation Eq. 3. Adding this increase $\Delta$F in reaction force to a value given by the ordinary varying characteristic of reaction force with operation amount S of the accelerator pedal gives an accelerator pedal reaction force instruction value FA.

Step S416 is provided to output the accelerator pedal reaction force instruction value FA obtained at step S415. After step S416, the present execution comes to an end. The controller 50C feeds this accelerator pedal reaction force instruction value FA to the accelerator pedal reaction force regulating device 70. The accelerator pedal reaction force regulating device 70 varies accelerator pedal reaction force with different instruction values FA in proportional relationship by controlling the servo motor 80.

The fourth exemplary embodiment works to produce effects as follows:

The controller 50C corrects the reaction force applied to the accelerator pedal 90 by correcting the risk potential reflecting running environment around the own vehicle. If the necessity for acceleration is low when the driver is driving the own vehicle at a constant speed during approaching and passing the preceding vehicle, it may be considered that a risk perceived by the driver is low. Correcting the risk potential RP with the necessity for acceleration provides a solution to tailor the risk potential RP to the degree of risk perceived by the driver. The second exemplary embodiment provides the same effect as the third exemplary embodiment by correcting the risk potential RP.

In each of the first to fourth exemplary embodiments, the driver's intention to change to the adjacent lane has been estimated based on the state of turn signal indicators. Other types of detection approaches may be used to determine the driver's intention. For instance, the driver's intention to change to the adjacent lane may be estimated based on the driver's sight line direction. Detection of a driving behavior of a driver using the driver's slight line direction is described in Japanese published patent application No. JP-A 2002-331850, the entire disclosure of which is incorporated herein by reference.

In each of the first to fourth exemplary embodiments, an accelerator pedal reaction force instruction value FA has been recorrected by setting a coefficient Kftd or Kftdp that is multiplied with a time constant Tsf based on necessity for acceleration, that is, an increase $\Delta Td$ in driver torque request or an estimated increase $\Delta Tdp$ in driver torque request. The present disclosure is not limited to this manner of correction. Instead of setting the coefficient, the time constant Tsf may be set based on the increase $\Delta Td$ in driver torque request or the estimated increase $\Delta Tdp$ in driver torque request. In a similar manner, a risk potential RP may be corrected by setting a time constant Tsr based on the increase $\Delta Td$ in driver torque request or the estimated increase $\Delta Tdp$ instead of setting a coefficient Krtd or Krtdp.

In each of the first to fourth exemplary embodiments, the risk potential RP has been calculated using the time to contact TTC between the own vehicle and the preceding vehicle. The present disclosure is not limited to this manner of calculating the risk potential RP. For example, the risk potential RP may be calculated using not only the time to contact TTC, but also a time headway THW.

In the third and fourth exemplary embodiments, one of the relative speed Vr, time to contact TTC and time derivative $\Delta RP$ of risk potential RP has been used, as the degree to which the own vehicle is approaching the preceding vehicle, to calculate an estimated increase $\Delta Tdp$ in driver torque request. Any combination of the relative speed Vr, time to contact TTC and time derivative $\Delta RP$ of risk potential RP may be used to calculate the estimated increase $\Delta Tdp$. Accordingly, at least one of the relative speed Vr, time to contact TTC and time derivative $\Delta RP$ of risk potential RP may be used to calculate the estimated increase $\Delta Tdp$ in driver torque request. Other parameters, for example, time headway THW, time derivative of time headway THW and time derivative of time to contact TTC, may be used to calculate the estimated increase $\Delta Tdp$ in driver torque request.

The relationship between the risk potential RP and the reaction force increase $\Delta F$ is not limited to that illustrated in FIG. 5. It is possible to set the reaction force increase $\Delta F$ to grow as the risk potential RP grows. In each of the first to fourth exemplary embodiments, the accelerator pedal reaction force instruction value FA, which results from adding the reaction force increase $\Delta F$ to the ordinary reaction force variation characteristic, has been corrected. In this case, the accelerator pedal reaction force regulating device 70 may be modified to regulate a reaction force from the accelerator pedal 90 accounting for the ordinary reaction force characteristic. It is also possible to correct the reaction force increase $\Delta F$ that is variable with the risk potential RP.

In each of the first to fourth exemplary embodiments, the laser radar 10, vehicle speed sensor 20 and front-view camera 30 perform the function of obtaining information related to an environment surrounding the vehicle. The risk potential calculating device 111 performs the function of risk potential calculating means. The accelerator pedal reaction force instruction value calculating device 112 performs the function of accelerator pedal reaction force calculating means. The accelerator pedal reaction force regulating device 70 performs the function of accelerator pedal reaction force generating means. The driver's intention detecting device 114 performs the function of driver's intention estimating means. The accelerator pedal reaction force instruction value correcting device 113 and the risk potential correcting device 121 perform the function of first accelerator pedal reaction force correcting device. The torque request variation amount detecting device 115 and the torque request variation amount estimating device 131 perform the function of acceleration necessity judging means. The accelerator pedal reaction force instruction value recorrecting device 116 and the risk potential recorrecting device 122 perform the function of second accelerator pedal reaction force correcting means. The present disclosure is not limited to the above examples, however. As the circumference recognizing means, radars of other types, such as, radar of the millimeter type, may be used. As the reaction force generating means, it is possible to use a steering wheel reaction force regulating device that generates a reaction force from the steering wheel. The above explanation is not intended to limit the present disclosure to the illustrated example and it is not intended to limit the disclosure as defined by the following claims.

In the previous descriptions, numerous specific details are set forth, such as specific materials, structures, processes, etc., in order to provide a thorough understanding of the present disclosure. However, as one having ordinary skill in the art would recognize, the present disclosure can be practiced without resorting to the details specifically set forth. In other instances, well known processing structures have not been described in detail in order not to unnecessarily obscure the present disclosure.

Only the illustrative embodiments of the disclosure and examples of their versatility are shown and described in the present disclosure. It is to be understood that the disclosure is capable of use in various other combinations and environments and is capable of changes or modifications within the scope of the inventive concept as expressed herein.

What is claimed is:

1. A driving assisting system for an own vehicle, comprising:
   a detector configured to detect at least one of an operation status of the own vehicle and a running environment around the own vehicle;
   a risk potential calculating device configured to calculate risk potential associated with the own vehicle based on a detection result of the detector;
   a driver's intention detecting device configured to estimate a driver's intention;
   an acceleration necessity judging device configured to judge necessity for acceleration; and
   a data processor configured to determine a reaction force to be transmitted to a driver from an accelerator pedal based on the calculated risk potential, the estimated driver's intention and the necessity for acceleration, in response to the estimated driver's intention being a predetermined type of intention.

2. The system of claim 1, wherein the data processor includes:
- a reaction force generating unit configured to generate a value of the reaction force based on the calculated risk potential;
- a first correction device configured to correct the value of the reaction force based on the estimated driver's intention; and
- a second correction device configured to further alter the corrected value of the reaction force based on the necessity for acceleration.

3. The system as recited in claim 2, wherein the acceleration necessity judging device judges the necessity for acceleration by measuring an increase in a driver torque request in response to the estimated driver's intention being the predetermined type of intention.

4. The system as recited in claim 3, wherein, if the increase in the measured driver torque request is no larger than a first predetermined value, the second correction device cancels the correction of the value of the reaction force performed by the first correction device.

5. The system of claim 4, wherein, responsive to the increase in the measured driver torque request being larger than the first predetermined value and no larger than a second predetermined value, a reduction rate of the reaction force corresponding to a smaller value of the measured driver torque request is slower than a reduction rate corresponding to a larger value of the measured driver torque request.

6. The system of claim 5, wherein, responsive to the increase in the measured driver torque request being larger than the second predetermined value, the reaction force is reduced at a first reduction rate that is faster than a second reduction rate corresponding to the increase in the measured driver torque request being smaller than the second predetermined value.

7. The system as recited in claim 3, wherein the second correction device alters the reaction force corrected by the first correction device in a way that the altered reaction force corresponding to a smaller increase in the driver torque request is greater than the altered reaction force corresponding to a larger increase in driver torque request.

8. The system as recited in claim 3, wherein the increase in the driver torque request is a variation in an operation amount of the accelerator pedal over a predetermined period of time immediately after the driver's intention detecting device has estimated that the driver's intention being the predetermined type of intention.

9. The system as recited in claim 2, wherein, responsive to the estimated driver's intention being the predetermined type of intention, the acceleration necessity judging device estimates an increase in a driver torque request.

10. The system as recited in claim 9, wherein, if the estimated increase in the driver torque request is no larger than a first predetermined value, the second correction device cancels the correction of value of the reaction force performed by the first correction device.

11. The system of claim 10, wherein, responsive to the estimated increase in the driver torque request being larger than the first predetermined value and no larger than a second predetermined value, a reduction rate of the reaction force corresponding to a smaller estimated value of the driver torque request is slower than a reduction rate corresponding to a larger estimated value of the driver torque request.

12. The system of claim 11, wherein, responsive to the estimated increase in the driver torque request being larger than the second predetermined value, the reaction force is reduced at a first reduction rate that is faster than a second reduction rate corresponding to the estimated increase in the driver torque request being smaller than the second predetermined value.

13. The system as recited in claim 9, wherein the second correction device alters the reaction force corrected by the first correction device in a way that the altered reaction force corresponding to a smaller estimated increase in the driver torque request is greater than the altered reaction force corresponding to a larger estimated increase in the driver torque request.

14. The system as recited in claim 9, wherein the acceleration necessity judging device estimates the increase in driver torque request based on a degree to which the own vehicle is approaching a preceding vehicle.

15. The system as recited in claim 14, wherein the degree is in the form of at least one of a relative speed between the own vehicle and the preceding vehicle, a time to contact with the preceding vehicle, and a time derivative of the risk potential.

16. The system as recited in claim 1, wherein the risk potential is corrected responsive to the estimated driver's intention being the predetermined type of intention.

17. The system of claim 16, wherein:
- the necessity for acceleration is determined by measuring an increase in a driver torque request in response to the estimated driver's intention being the predetermined type of intention;
- responsive to the measured increase in the driver torque request being no larger than a first predetermined value, the corrected risk potential is restored to an uncorrected value; and
- the reaction force is determined based on the restored risk potential.

18. The system of claim 17, wherein:
- responsive to the measured increase in the driver torque request being larger than the first predetermined value, the corrected risk potential is altered based on the measured increase in the driver torque request; and
- the reaction force is determined based on the altered risk potential.

19. The system of claim 16, wherein:
- the necessity for acceleration is determined by estimating an increase in a driver torque request in response to the estimated driver's intention being the predetermined type of intention;
- responsive to the estimated increase in the driver torque request being no larger than a first predetermined value, the corrected risk potential is restored to an uncorrected value; and
- the reaction force is determined based on the restored risk potential.

20. The system of claim 19, wherein:
- responsive to the estimated increase in the driver torque request being larger than the first predetermined value, the corrected risk potential is altered based on the estimated increase in the driver torque request; and
- the reaction force is determined based on the altered risk potential.

21. A driving assisting system for an own vehicle, comprising:
- detecting means for detecting at least one of an operation status of the own vehicle and a running environment around the own vehicle;
- risk potential calculating means for calculating risk potential associated with the own vehicle based on a detection result of the detecting means;
- intention detecting means for estimating a driver's intention;

judgment means for judging necessity for acceleration; and data processing means for determining a reaction force to be transmitted to a driver from an accelerator pedal based on the calculated risk potential, the estimated driver's intention and the necessity for acceleration, in response to the estimated driver's intention being a predetermined type of intention.

22. A method of assisting a driver of an own vehicle, comprising: detecting at least one of an operation status of the own vehicle and a running environment around the own vehicle;

calculating risk potential associated with the own vehicle based on a detection result of the detector;

estimating a driver's intention;

judging necessity for acceleration; and responsive to the estimated driver's intention being a predetermined type of intention, determining a reaction force to be transmitted to a driver from an accelerator pedal based on the calculated risk potential, the estimated driver's intention and the necessity for acceleration.

23. A vehicle comprising:

a driving assisting system provided with:

a detector configured to detect at least one of an operation status of the own vehicle and a running environment around the vehicle;

a risk potential calculating device configured to calculate risk potential associated with the vehicle based on a detection result of the detector;

a driver's intention detecting device configured to estimate a driver's intention;

an acceleration necessity judging device configured to judge necessity for acceleration; and a data processor configured to determine a reaction force to be transmitted to a driver from an accelerator pedal based on the calculated risk potential, the estimated driver's intention and the necessity for acceleration, in response to the estimated driver's intention being a predetermined type of intention.

* * * * *